US010377623B2

(12) United States Patent
Arcand

(10) Patent No.: US 10,377,623 B2
(45) Date of Patent: Aug. 13, 2019

(54) SYSTEM AND METHOD FOR DISPENSING AND SALE OF BULK PRODUCTS

(71) Applicant: Neurones Vision Inc., St-Felicien OT (CA)

(72) Inventor: Martin Arcand, Roberval (CA)

(73) Assignee: Neurones Vision Inc., St-Felicien (CA)

( * ) Notice: Subject to any disclaimer, the term of this patent is extended or adjusted under 35 U.S.C. 154(b) by 196 days.

(21) Appl. No.: 14/750,578

(22) Filed: Jun. 25, 2015

(65) Prior Publication Data

US 2015/0375984 A1   Dec. 31, 2015

Related U.S. Application Data

(60) Provisional application No. 62/017,907, filed on Jun. 27, 2014.

(51) Int. Cl.
*B67D 7/32* (2010.01)
*B67D 7/02* (2010.01)
*B67D 7/14* (2010.01)
*B67D 7/34* (2010.01)
*G06Q 20/14* (2012.01)
(Continued)

(52) U.S. Cl.
CPC .............. *B67D 7/3281* (2013.01); *B65B 1/06* (2013.01); *B67D 7/02* (2013.01); *B67D 7/145* (2013.01); *B67D 7/346* (2013.01); *B67D 7/348* (2013.01); *B67D 7/84* (2013.01); *G06Q 20/145* (2013.01); *G07F 13/065* (2013.01); *B65B 2039/009* (2013.01)

(58) Field of Classification Search
CPC ........ B67D 7/145; B67D 7/346; B67D 7/348; B67D 7/3281; B67D 7/02; B67D 7/34; B67D 7/344; G07F 13/065; G06Q 20/145
See application file for complete search history.

(56) References Cited

U.S. PATENT DOCUMENTS 4,174,742 A * 11/1979 Murphey ............... G07F 13/10
141/104
5,727,609 A * 3/1998 Knight .................. G07F 13/10
141/104
(Continued)

FOREIGN PATENT DOCUMENTS

CA    2527783 A1    1/2005
CA    2578239 A1    3/2006
(Continued)

*Primary Examiner* — Timothy L Maust
*Assistant Examiner* — Andrew D Stclair
(74) *Attorney, Agent, or Firm* — de Wilton Intellectual Property Inc.

(57) ABSTRACT

A system for managing bulk product dispensing and sale in a retail establishment includes a bulk product dispenser for dispensing bulk product into a re-usable container which includes an ID tag identifying said container. A user interface receives a product fill request for a bulk product selected from a plurality of bulk products capable of being dispensed. Then a dispenser controller verifies the compatibility of said product fill request with said container by verifying the product requested satisfies restrictions based on information associated with the ID tag, and responsive to said verifying, either controlling said dispenser to fill said container with the requested product, or displaying a warning to a user if the request is not compatible.

21 Claims, 24 Drawing Sheets

(51) Int. Cl.
  *G07F 13/06* (2006.01)
  *B65B 1/06* (2006.01)
  *B67D 7/84* (2010.01)
  *B65B 39/00* (2006.01)

(56) References Cited

U.S. PATENT DOCUMENTS

| | | | |
|---|---|---|---|
| 6,483,434 B1 | 11/2002 | UmiKer | |
| 7,277,866 B1 | 10/2007 | Or-Bach et al. | |
| 7,617,132 B2 | 11/2009 | Reade et al. | |
| 7,617,850 B1 | 11/2009 | Dorney | |
| 7,624,922 B2 | 12/2009 | Brown | |
| 7,750,817 B2 * | 7/2010 | Teller | B67D 3/0077 222/55 |
| 7,819,116 B2 | 10/2010 | Brand et al. | |
| 7,963,439 B2 | 6/2011 | Brown | |
| 8,032,430 B2 | 10/2011 | Bodin et al. | |
| 8,156,013 B2 | 4/2012 | Dearlove et al. | |
| 8,240,508 B2 | 8/2012 | Wegelin et al. | |
| 8,266,018 B2 | 9/2012 | Dearlove et al. | |
| 8,365,991 B2 | 2/2013 | Brown et al. | |
| 8,561,830 B2 | 10/2013 | Hallberg | |
| 8,565,916 B2 | 10/2013 | Zhang et al. | |
| 2003/0051767 A1 | 3/2003 | Coccaro et al. | |
| 2006/0261156 A1 * | 11/2006 | Brown | B67D 7/02 235/381 |
| 2007/0214055 A1 | 9/2007 | Temko | |
| 2008/0052202 A1 | 2/2008 | Bodin et al. | |
| 2010/0024915 A1 * | 2/2010 | Thomas | A47L 13/50 141/69 |
| 2010/0032437 A1 | 2/2010 | Lossau | |
| 2010/0072273 A1 | 3/2010 | Brown | |
| 2010/0108755 A1 | 5/2010 | Fuerstenberg et al. | |
| 2010/0153220 A1 | 6/2010 | Hamm | |
| 2011/0100506 A1 | 5/2011 | Zabludovsky-Nerubay | |
| 2011/0125563 A1 | 5/2011 | Klein et al. | |
| 2011/0320308 A1 | 12/2011 | Dearlove et al. | |
| 2012/0222938 A1 | 9/2012 | Rose, Jr. et al. | |
| 2013/0226337 A1 | 8/2013 | Leech et al. | |
| 2013/0240084 A1 * | 9/2013 | Carter | B67D 1/0004 141/94 |
| 2014/0053950 A1 * | 2/2014 | Vandersteen | G07F 11/002 141/83 |
| 2014/0059581 A1 * | 2/2014 | Wang | B67C 3/007 725/24 |

FOREIGN PATENT DOCUMENTS

| | | |
|---|---|---|
| CA | 2578926 A1 | 3/2006 |
| CA | 2705259 A1 | 5/2009 |
| CA | 2578239 C | 7/2011 |
| CA | 2759132 A1 | 5/2013 |
| CN | 102265122 B | 12/2012 |
| EP | 2599060 A2 | 6/2013 |
| WO | 9635635 A1 | 11/1996 |
| WO | 03005295 A1 | 1/2003 |
| WO | 2008055929 A1 | 5/2008 |
| WO | 2010075557 A1 | 7/2010 |

* cited by examiner

Transaction– Part 1 of 3

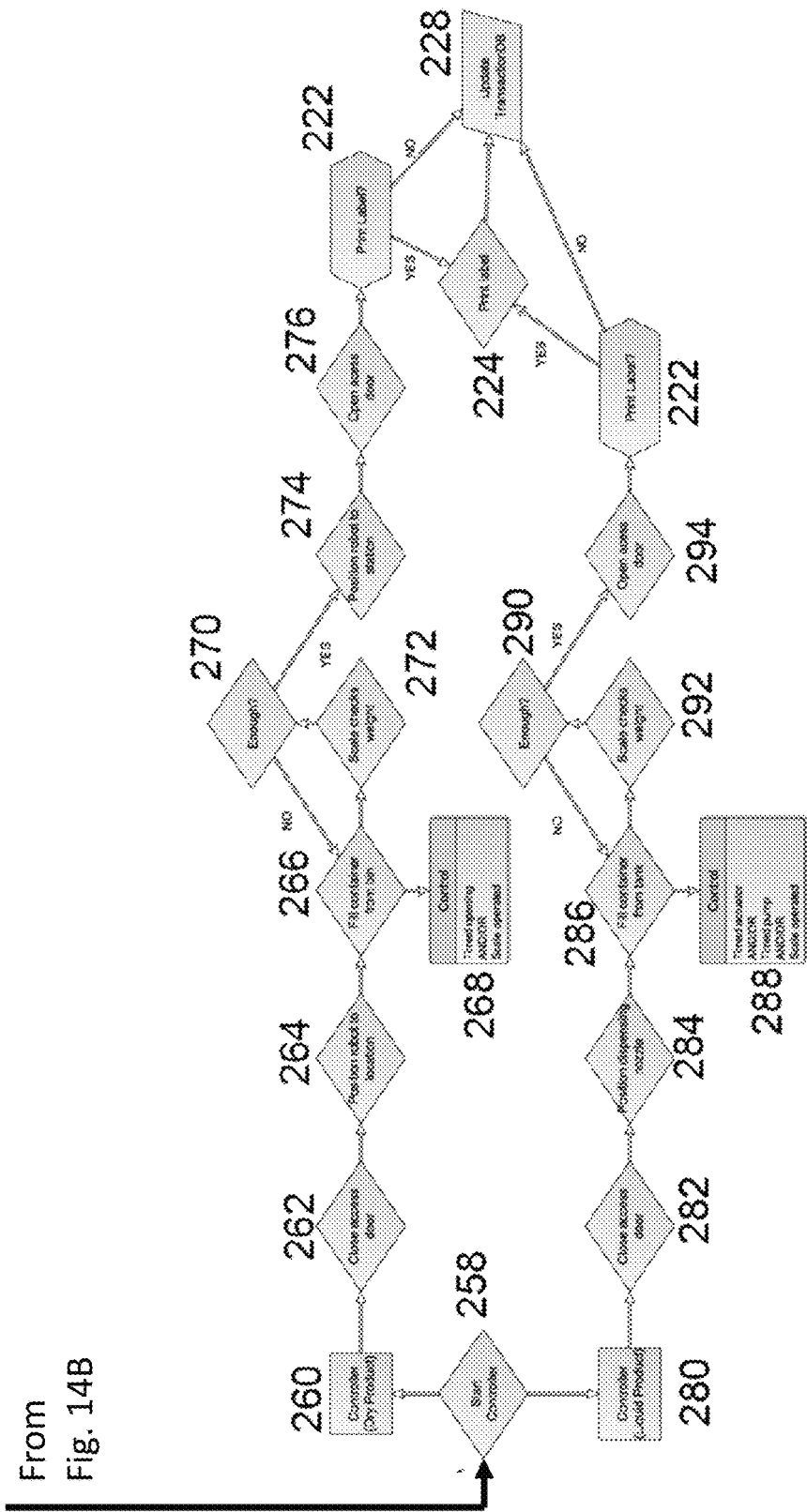

Store Management – Part 1 of 2

SYSTEM AND METHOD FOR DISPENSING AND SALE OF BULK PRODUCTS

CROSS-REFERENCE TO RELATED APPLICATION(S)

This application claims priority from U.S. provisional patent application No. 62/017,907, filed Jun. 27, 2014, entitled "SYSTEM AND METHOD FOR DISPENSING AND SALE OF BULK PRODUCTS", which is hereby incorporated by reference in its entirety.

TECHNICAL FIELD

This invention relates to dispensing and selling bulk products, and more particularly to systems and methods for doing so using re-usable containers.

BACKGROUND

Single-use container consumption is increasing at a fast pace. Despite efforts to encourage consumer recycling, a significant percentage of product packaging (including plastic products) are not recycled and reach landfills. While recycling containers is better for the environment than placing them in landfill, re-using containers has the additional advantage of reducing the use of resources (for making and shipping the containers), making re-using containers a better alternative both for environmental and cost rationales.

One known method of reducing packaging is the selling of products in bulk. However the typical bulk food store utilizes bins of bulk product which are manually placed in disposable plastic bags by end users or customers using scoops. Such a store is unappealing to at least a segment of the population due to the unsanitary nature of having consumers handle scoops which are put into accessible food bins. While some stores provide plastic gloves for users, not all users use the gloves, and this increases the use of disposable plastic. The current concepts also require the store employee to recognize the products within the bags, which could lead to confusion and affect the store inventory.

Beverage dispensers for dispensing soda into cups have been used by restaurants for years. This allows the restaurant to buy soda in bulk (typically involving buying syrup in bulk and mixing the syrup with soda water). However such a system dispenses soda beverages for immediate consumption within the restaurant or in disposable cups.

There have been some advances in the art of dispensing soda beverages into re-usable cups. For example, U.S. Pat. No. 7,617,850, entitled "Beverage Dispensing System" discloses a beverage dispensing system that allows for re-using RFID (Radio-Frequency Identification) tagged cups. The system can also be used for inventory management and billing users who have (re-)filled their cups. The system has the advantage of reducing beverage theft by not dispensing the beverage for containers which have not been authorized.

Similarly, U.S. Pat. No. 8,565,916 entitled "Method or Printing Indicia on Vessels to Control a Beverage Dispenser", teaches a system for stopping beverage theft from beverage dispensers in locations with uncontrolled access. It teaches tagging containers to ensure the container is authorized to use the dispenser.

While such systems are useful for reducing wasteful packaging by allowing the refilling of cups, both patents only describe beverage dispensing systems. They do not teach or suggest a system that can be used to allow for the dispensing of a variety of bulk products into a plurality of container types. Accordingly, there is no teaching or suggestion of a compatibility check for valid container type for the product requested, or for user preferences/allergies, or for previous fill history of the container. It only checks whether authorized, and where purchased for billing purposes. It does not provide for a compatibility check to ensure the selected product is compatible with the container itself (including previous contents of the container, or with user defined preferences associated with the container). The present disclosure teaches an improved system with several advantages over such a system. For example, the present disclosure allows for containers to be used for a variety of products, including both dry goods and liquids, and provides mechanisms to avoid the contamination of food items with non-food items, toxins, and/or allergens.

U.S. Pat. No. 7,617,132, entitled "RFID System and Method for Ensuring Food Safety" discloses an RFID system used to provide consumers with food product information. The food products are provided with smart tags. A smart tag scanner is used to retrieve the food product information from the smart tags. The consumers scan a potential food product with the scanner and, based on the retrieved food product information, make an informed decision as to whether to purchase or consume the food product. However, such a system does not disclose, teach or suggest a system to prevent bulk containers to be refilled with potential allergens or incompatible products.

U.S. Pat. No. 7,624,922 titled "Method and Apparatus for Vending a Containerized Liquid Product Utilizing an Automatic Self-Service Refill System", discloses a system for dispensing liquid products into reusable containers. The system usefully allows for the mixing of ingredients to provide a custom mixture, and even confirms the mixing of a user selected optional ingredient is compatible with a base mixture. The system then automatically dispenses the same product for subsequent refills. The system prints coupons for subsequent refills. Such a system is useful for reducing wasteful packaging, and does establish brand loyalty (by encouraging with coupons and enforced by only refilling same product). However, it has the disadvantage of not allowing for refilling of different products on subsequent refills. Accordingly, such a system fails to provide a mechanism for allowing users to re-use containers for different products. While this is useful for a dispensing station located in a traditional grocery establishment, and dedicated to a single brand, it is not as useful for a grocery store providing a variety of bulk products. Accordingly, it does not provide for a compatibility check to ensure the selected product is compatible with the container itself (including previous contents of the container), or with user defined preferences. The present disclosure teaches an improved system with several advantages over such a system. For example, the present disclosure allows for a retail establishment to dispense and sell a variety of bulk products, including both dry goods and liquids, and provides mechanisms to avoid the contamination of food items with non-food items, toxins, and/or allergens.

Thus, there is a need for systems and methods for dispensing bulk products into re-usable containers, which provide improved flexibility and lowers costs (to retailers, their suppliers, customers, and to the environment).

SUMMARY OF INVENTION

The present invention seeks to eliminate, or at least mitigate, disadvantages of these known systems and methods, or at least provide an alternative.

Thus, aspects of the invention provide a system, method, and software for managing bulk product dispensing and sale in a retail establishment, as well as a store layout.

A first aspect of the invention provides a bulk product dispensing system for dispensing and sale of bulk product to consumers at a vending location, comprising:

a dispensing station comprising an ID tag reader and a bulk product dispenser for dispensing bulk product into a re-usable container which includes an ID tag providing a container ID uniquely identifying said container;

a database server comprising:

a) a container database storing for each of a plurality of containers, the container ID and associated container information comprising: container characteristics comprising a container type and at least one of a container size and weight; and container fill history;

b) a user information database storing for each of a plurality of users, a user ID uniquely identifying the user and associated user information comprising user preferences; and c) wherein each user ID is linked to the container ID for each of one or more containers registered to the user ID and the container ID for each of said one or more containers is linked with user preferences selected for the container ID;

a dispenser controller comprising a processor, a machine readable medium storing instructions and a communication interface configured for communication with the ID tag reader and with the database server, the dispenser controller being configured to communicate with the ID tag reader to obtain the container ID of a container placed at the dispensing station and to communicate with the database server using said container ID to perform a lookup of the user ID, associated user information, associated container information, and user preferences selected for said container ID;

a user interface for communication with a user;

said dispenser controller in communication with the user interface, the user interface configured for receiving from a user a product fill request for at least one product selected from a plurality of bulk products available to be dispensed by said dispenser, said product fill request comprising a user selected amount of each of said at least one product;

said dispenser controller configured to verify compatibility of said product fill request with said container by verifying the product requested satisfies restrictions based on said associated container information and user preferences selected for the container ID, and responsive to said verifying, either controlling said dispenser to fill said container with the user selected amount of the at least one product, or displaying a warning to the user if the product fill request is not compatible.

The user information is a set of user attributes about the user who has leased or purchased the container, including user preferences, which can include allergy information for that user. The information can also include previous fill information for that container. This provides for a compatibility check to help a user avoid inadvertently dispensing and paying for product that they have previously indicated they would prefer to avoid, at least for a designated container. For example, if a user includes a family member with an allergy/intolerance, they may want to allocate some containers as allergy free containers (assuming the allergy is not so severe as to enforce an allergy free household). Similarly, some containers can be classified as vegetarian. Accordingly, the controller can display a warning to the user of a detected incompatibility, and suggests the user use a different container.

A second aspect of the invention provides a method for managing dispensing and sale of bulk products to consumers, at a vending location comprising a bulk product dispensing system comprising a plurality of dispensing stations for dispensing a plurality of bulk products, the method comprising:

in a database server of a dispenser control system:

for each of a plurality of reusable containers, each having an ID tag providing a container ID uniquely identifying the container, storing in a container database the container ID and associated container information, the associated container information comprising: container characteristics, comprising a container type and at least one of a container size and weight; and container fill history;

for each of a plurality of users, storing in a user information database a user ID uniquely identifying the user and associated user information comprising user preferences;

for each user, registering one or more containers to the user, comprising linking the user ID and container IDs for each of said one or more containers and linking each container ID to user preferences selected for the container ID;

at a dispensing station comprising an ID tag reader:

reading the ID tag of the container to be filled to obtain the container ID;

in the dispenser control system:

receiving said container ID from the ID tag reader;

querying the database server using the container ID to perform a lookup of the user ID, associated user information, associated container information, and user preferences selected for said container ID;

receiving from a user interface in communication with the control system a product fill request for filling a container with at least one selected product selected from a plurality of bulk products available at said dispensing station, said product fill request comprising a user selected amount of said at least one selected product;

confirming compatibility of said product fill request and the container by verifying the product fill request satisfies restrictions based on said associated container information and user preferences selected for the container ID, and responsive to said verifying, if the product fill request is compatible, dispensing the user selected amount of the at least one selected product into the container; and storing transaction information comprising what was dispensed into the container; or if the product fill request is not compatible, displaying a warning to the user. Another aspect includes one or more processors and machine readable memory for storing instructions for causing said one or more processors to execute said steps.

Another aspect of the invention provides a bulk product dispensing system comprising: a bulk product dispenser, said dispenser including a placement location for receiving a container for receiving bulk product from said dispenser, said dispenser capable of dispensing a plurality of bulk products; a dispenser controller capable of receiving a product fill request for a selected bulk product; and an alignment controller for aligning the opening of said container to a dispensing mechanism of a selected product.

Another aspect of the invention provides a store arrangement for the dispensing and selling of bulk products into ID tagged re-usable containers comprising: at least one main interior portion in which consumers obtain said bulk products; and at least one secondary interior portion for storing tanks of liquid products; at least one ID tag reader for reading tags of said re-usable containers. In such a store arrangement, the interior portion includes: at least one centrally located dry good dispensing station for dispensing a plurality of dry goods into said ID tagged re-usable containers; at least one wall separating said at least one main interior portion from said at least one secondary portion; and at least one liquid dispensing station proximate to said at least one wall for dispensing liquid products and connected to said tanks.

Another aspect of the invention provides a system for managing dispensing and sale of bulk products to users at a vending location comprising a plurality of dispensing stations for filling reusable containers, the system comprising: a controller for registering users and containers, the controller storing: a container identifier (ID) and container information for each of a plurality of passive ID tagged containers; a unique user ID and user information for each of a plurality of users; and for each user, storing one or more container identifiers for containers associated with the user; and at each dispensing station: a short range ID reader for reading the container ID of the container to be filled, a user interface for receiving user input, and a communications interface to the controller for transmitting the container ID to the controller for confirming compatibility of the selected product and the container, and receiving instructions from the controller for controlling dispensing of the selected product based on the container ID and associated user information;

Thus, systems and methods discussed herein provide for multiple advantages directed to consumers, the retail establishment, the suppliers and the environment of the planet.

The foregoing and other objects, features, aspects and advantages of the present invention will become more apparent from the following detailed description, taken in conjunction with the accompanying drawings, of exemplary embodiments of the invention, which description is by way of example only.

BRIEF DESCRIPTION OF DRAWINGS

FIGS. 14A, 14B and 14C are respectively, parts 1, 2 and 3 of a flowchart illustrating an exemplary process executed by a system controller for a dispensing transaction;

DESCRIPTION OF EXEMPLARY EMBODIMENTS

Figure 1:
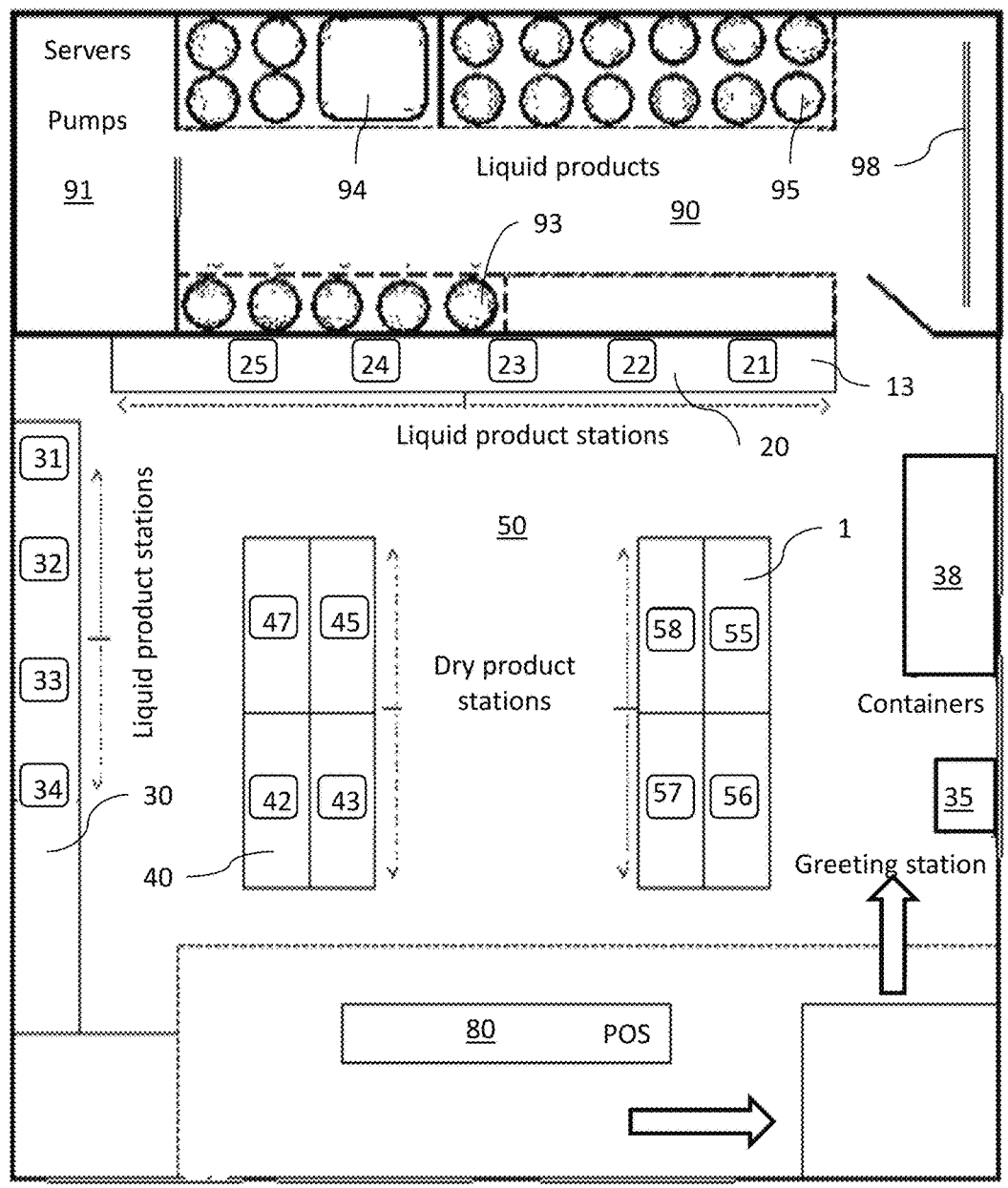
FIG. 1 illustrates schematically an exemplary embodiment of a store arrangement for the dispensing and selling of bulk products into ID tagged re-usable containers.

Embodiments of the present invention are directed to a new retail store concept offering every day consumption items, such as food, personal care products and cleaning products, at bulk prices, in a sustainable manner. The products are dispensed into reusable and identifiable containers. The operating costs are reduced as the operations are largely automated. The methods and systems in such a concept allow for ongoing inventory tracking in real time, allowing for improved inventory management and optimizing the supply chain which both reduces costs and advantageously reduces the use of non-renewable energy.

Suppliers will benefit by reducing their distribution and packaging costs, by being able to distribute their products in bulk. Consumers will obtain great quality products, an improved buying experience and will encourage the reduction, reuse and recycling of plastic containers.

Users will select products to fill their containers themselves within the store. The containers, sold in the store, will be equipped with a unique RFID tag. There will be different container sizes and shapes which can be selected by the user. These may be acquired at a central location (preferably near the entrance of the store), or alternatively, there may be several container depots throughout the store. The customer will chose the appropriate container size and accessory (spout, full opening, screwable opening, faucet, spray, etc.) for their particular need. Once the container is properly placed at a filling station, and the client chooses the desired product, the product is then pumped or gravity dispensed into the container. A label is printed and the client affixes it to the container. If a product is being refilled, the label is not necessarily reprinted. Once the client has finished filling containers, the point of sale recognizes all of the containers with the client and obtains the final price to pay from the database.

Reference may be made below to specific elements, numbered in accordance with the attached Figures. The discussion below should be taken to be exemplary in nature, and not as limiting of the scope of the present invention. The scope of the present invention is defined in the claims, and should not be considered as limited by the implementation details described below, which as one skilled in the art will appreciate, can be modified by replacing elements with equivalent functional elements.

Embodiments of the invention may be represented as a software product stored in a machine-readable medium (also referred to as a computer-readable medium, a processor-readable medium, or a computer usable medium having a computer readable program code embodied therein). The machine-readable medium may be any suitable tangible medium including a magnetic, optical, or electrical storage medium including a diskette, compact disk read only memory (CD-ROM), digital versatile disc read only memory (DVD-ROM) memory device (volatile or non-volatile), or similar storage mechanism. The machine-readable medium may contain various sets of instructions, code sequences, configuration information, or other data, which, when executed, cause a processor to perform steps in a method according to an embodiment of the invention. Those of ordinary skill in the art will appreciate that other instructions and operations necessary to implement the described invention may also be stored on the machine-readable medium. Software running from the machine-readable medium may interface with circuitry to perform the described tasks.

FIG. 1 illustrates an exemplary embodiment of a store arrangement for the dispensing and selling of bulk products into ID tagged re-usable containers. The store includes main interior portions 50 in which customers enter and select products to be filled into re-usable containers. The interior portion includes bin 38 from which customers obtain new ID tagged re-usable containers, centrally located dry good dispensing stations 1, 40 for dispensing a plurality of dry goods into said ID tagged re-usable containers, liquid product stations 20 and 30, and point of sale (POS) 80.

Dry product station 1 includes 4 substations 55, 56, 57 and 58, whereas dry product station 40 includes four substations 42, 43, 45 and 47. The number of dispensing stations and sub-stations can vary depending on the size of store, number of products carried, and expected number of customers. The substations serve two main purposes. First, they act like the aisles of a grocery store, indicating where certain types of products are located. In addition, each substation is capable of filling a container, so the more substations, the more customers can be served simultaneously.

Each of the plurality of dispensing stations includes indicia of its product type, and further may display brand logos of particular brands of said type, from suppliers who have offered a benefit to said store (e.g., offer advertising revenue, discounted prices, mutual promotion or some other benefit.).

As but one exemplary arrangement, substation 56 would dispense a variety of baking products, substation 55 would dispense varieties of rice and pasta; substation 57 would dispense varieties of cereals, substation 58 would dispense varieties of teas and coffees, substation 43 would dispense varieties of nuts, substation 45 would dispense varieties of spices, substation 42 would dispense varieties of candy and substation 47 would dispense varieties of sugar and food bases.

Similarly liquid product stations 20 and 30 are divided into substations, each indicating and dispensing a different class of liquid products. In addition, liquids products may be allocated to different substations based on whether they are edible or non-edible (e.g., cleaning or automotive products), and on their viscosity, as different pumps may be needed. As but one exemplary example, substation 21 would dispense highly viscous edible liquids such as honeys and syrups, Substation 22 would dispense edible oils, substation 23 would dispense condiments (vinegars, sauces, salad dressing and the like), substation 24 would dispense liquid laundry detergent and fabric softeners. Liquid product stations 20 are adjacent to a wall 13 which divides the store into the first interior portion 50, which houses the dispensing stations, and a second interior portion 90.

The secondary interior portion 90 stores tanks 93, 94, 95 of liquid products, as well as houses pumps for said tanks, and servers (possibly in separate server room 91), as well as storage space for store items, cleaning supplies and additional bulk product for refilling the bins of the dry good dispensers and loading bay door 98.

Some liquid goods can be gravity fed from overhead tanks, which need not be housed in a secondary portion. According to one exemplary arrangement, liquid dispensing stations 30 include substations 31 for cleaning products/bleach, substation 32 for liquid soaps and shampoo/conditioners, substation 33 for lotions, and substation 34 for automotive fluids, such as, windshield washer fluid and engine oil. Of course, an additional dividing wall and additional pump/tank room could be utilized.

FIG. 1 also includes a point of sale (POS) checkout station. Not shown in FIG. 1, but also present, is a plurality of ID tag antennas (one per dispenser, plus one in POS and possibly one in greeting station 30) and at least one ID tag reader (possibly located in server room 91 if shared, although the dispensing stations could include their own) for reading tags of said re-usable containers.

Figure 2:
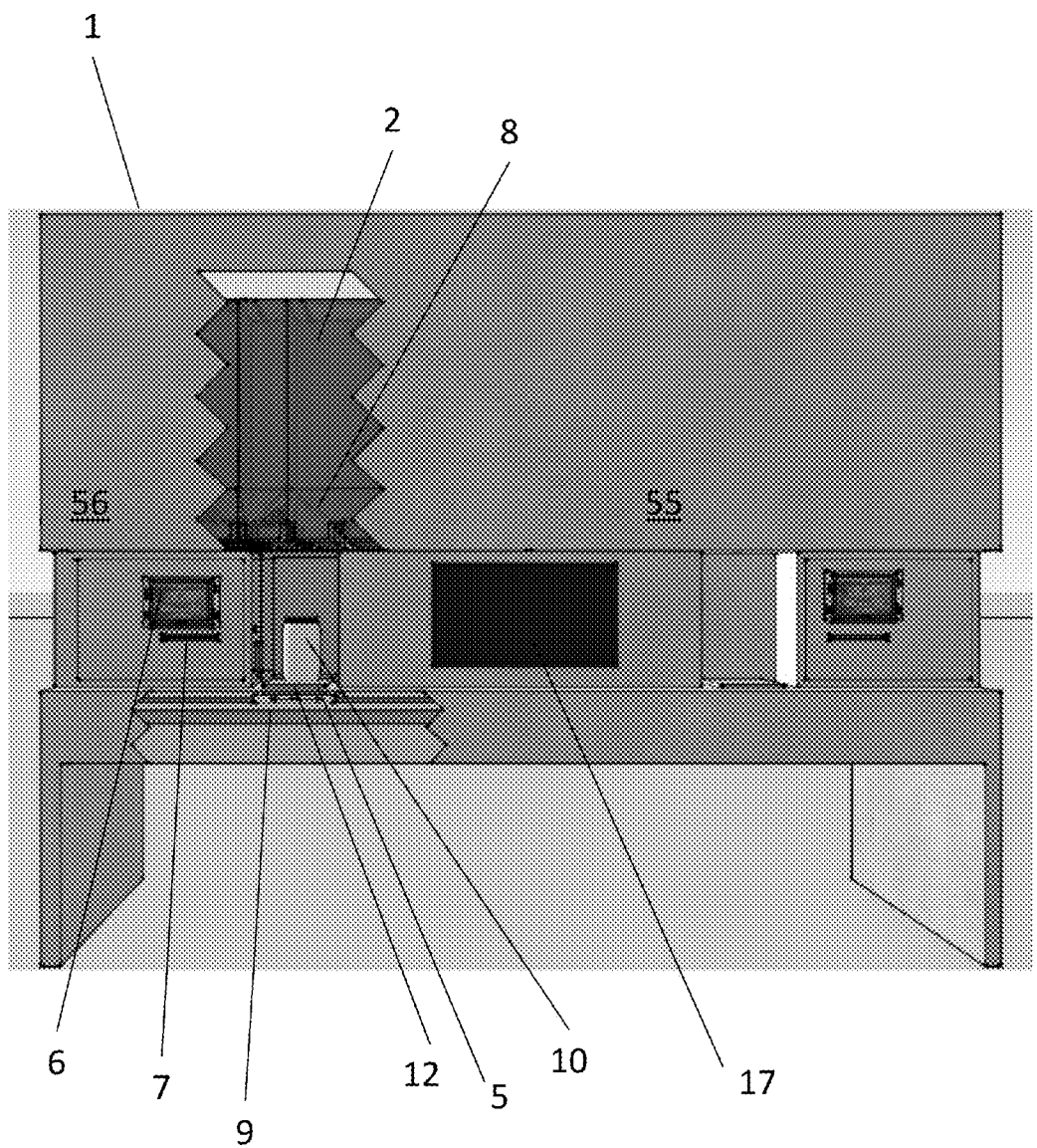
FIG. 2 is a schematic front view of the dispenser 1 of FIG. 1 according to an exemplary embodiment of the invention.
Figure 3:
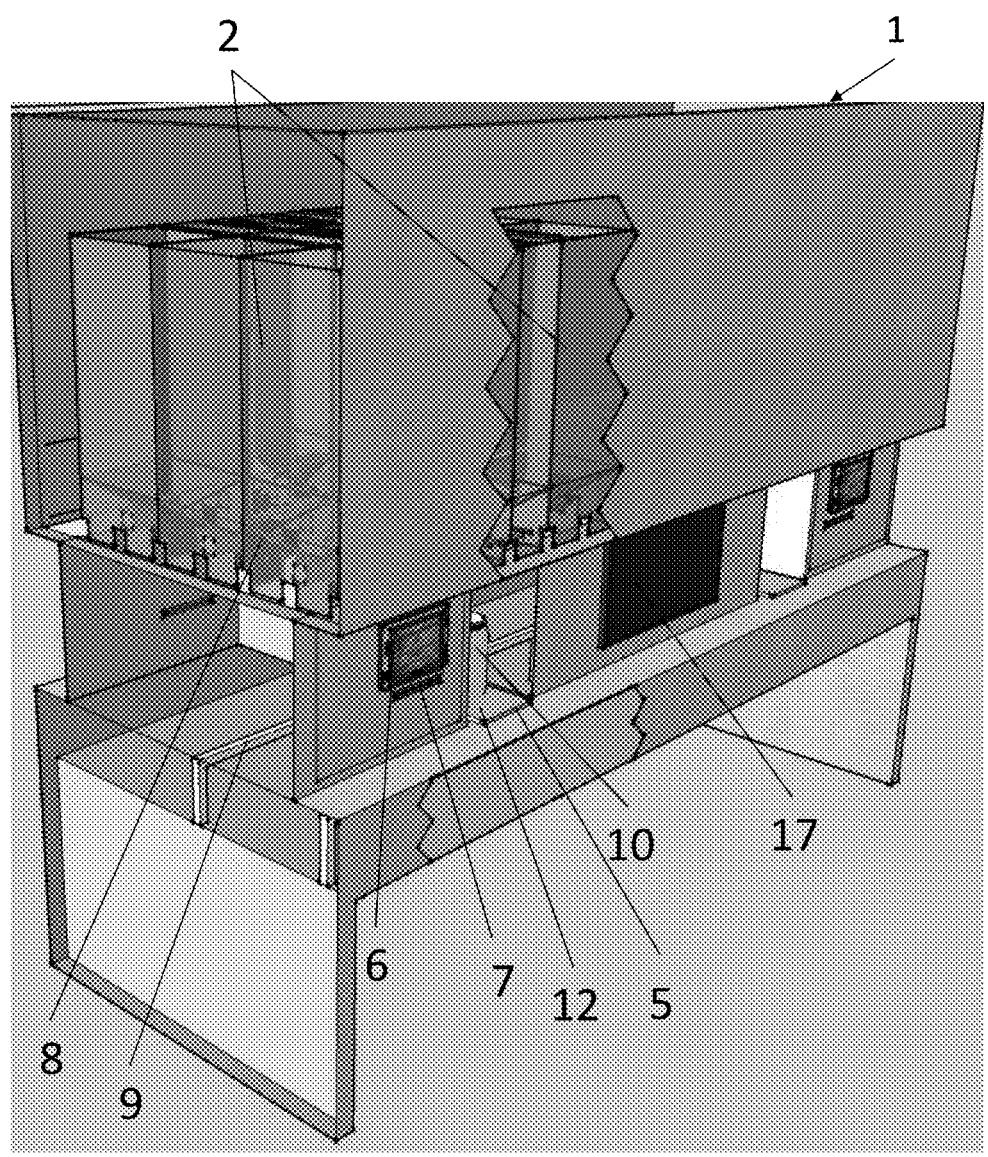
FIG. 3 is an isometric view of the dispenser 1, with a side panel removed to show the plurality of bins.
Figure 4:
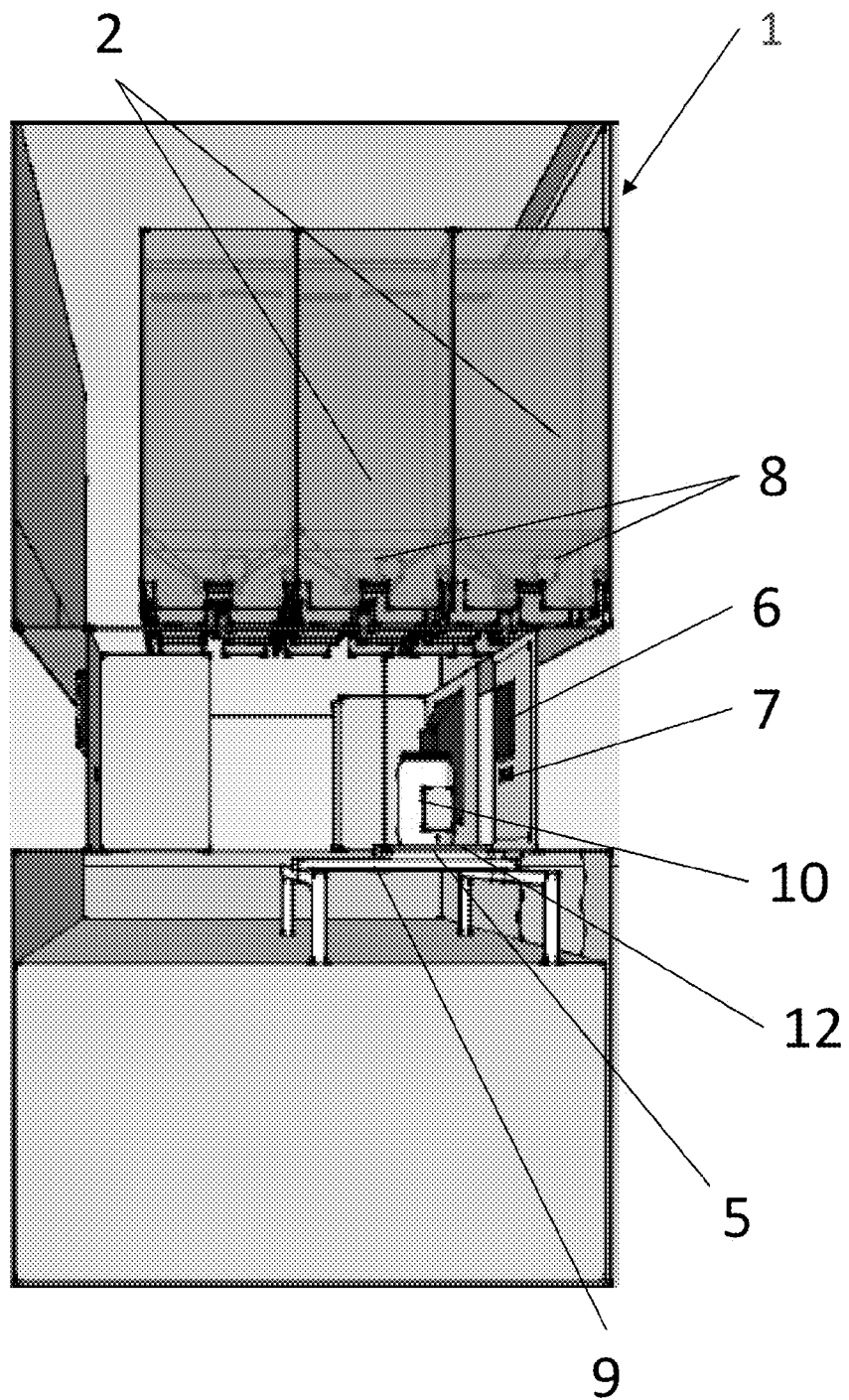
FIG. 4 is a side view of the dispenser 1.

FIGS. 2 to 4 provide different views of dry product dispenser 1, and in particular substation 56, according to an embodiment of the invention. FIG. 2 is a schematic front view of the dispenser 1. The dispenser 1 includes a plurality of bulk product bins 2 (visible through the cutaway (shown for illustrative purposes only)). Bins 2 are not accessible by customers, and each includes a dispensing mechanism 8 for dispensing the product from that bin. The dispenser also includes a user interface device, for example touch screen display 6, and label printer 7. RFID Tagged container 10 is placed on scale 5, which may include grooved alignment plate 12 for ensuring each of a plurality of different type of containers (in terms of size and shape) are properly positioned. The dispenser includes a RFID tag reader 3, or alternatively, a short range RFID antenna linked to a shared external reader, for reading the RFID tag of the container. Optional proximity sensor 4 detects the presence of a container, triggering the RFID reader to read the tag of the container. Scale 5 sits or forms part of robotic assembly 9, which is best viewed in FIG. 5. Optional TV screen 17 offers product information and/or advertising.

FIG. 3 is an isometric view of the dispenser 1, with a side panel removed to show the plurality of bins 2. While each bin is shown to be of the same size, the bins can be of different sizes, depending on the type of product and expected volumes demanded. FIG. 4 is a side view. Note that, in both of said views, the details of substation 57 are omitted.

As can be seen, the dispenser includes a plurality of product bins 2 holding a plurality of products which can be selected utilizing user interface 6. In order to obtain product, the user simply places the container 10 onto the plate 12/scale 5. The bulk product dispensing system further comprises an alignment controller for aligning the opening of said container to a dispensing mechanism of a selected product. According to one embodiment, the plate/scale rests on (or forms part of) a robotic assembly 9 which aligns the opening of said container to a dispensing mechanism of a selected product.

Figure 5:
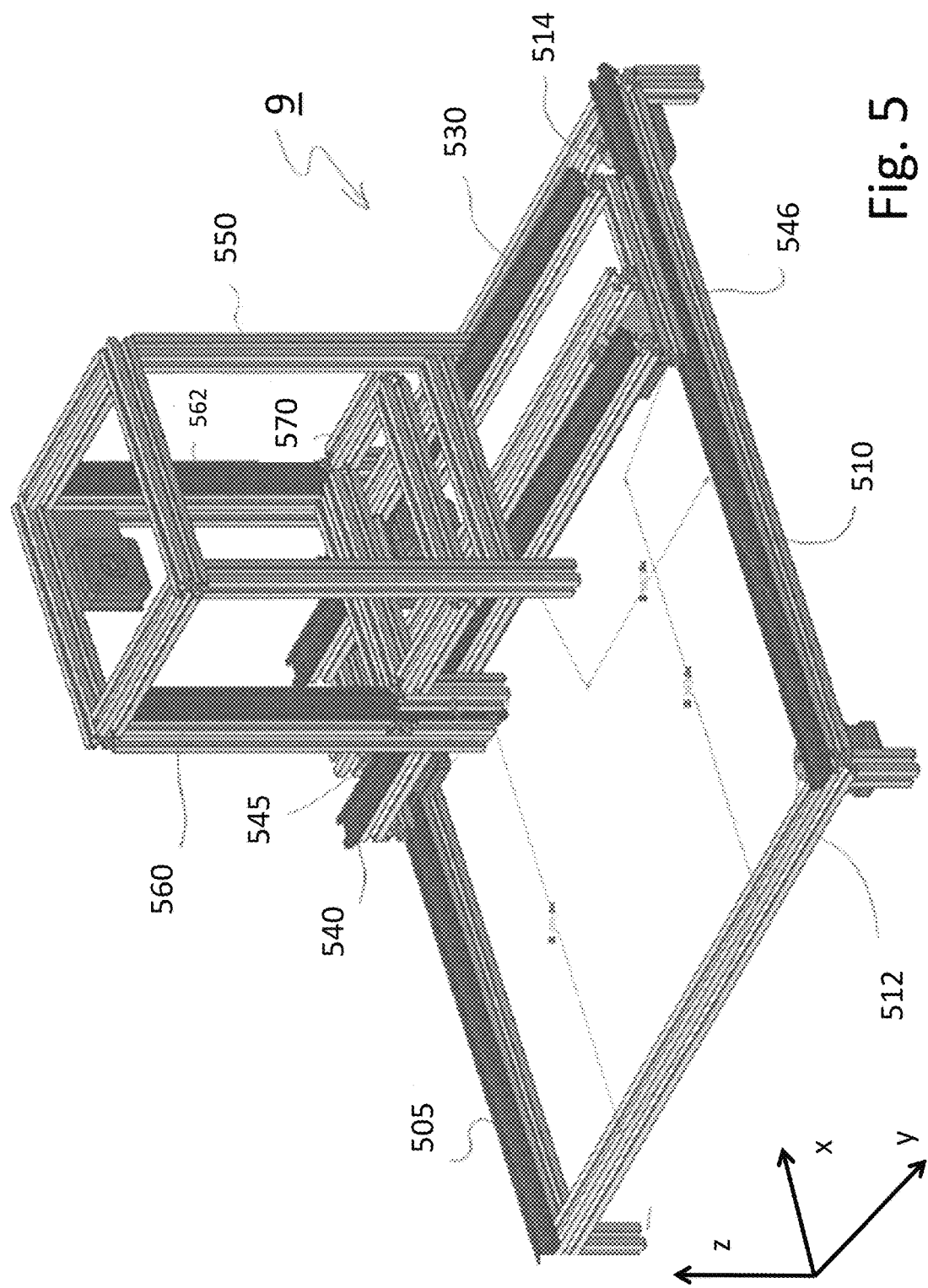
FIG. 5 illustrates an exemplary embodiment of a robotic assembly structure, for moving a container to a position associated with a selected product for receiving said product.

FIG. 5 illustrates an exemplary embodiment of a robotic assembly structure, for moving said container to a position associated with the selected product in order to receive said product. In this embodiment, the plate 12 is affixed to (or alternatively forms part of) platform support structure 520, which can be moved in the x, y and z directions. The z direction represents height, and is included in some embodiments to raise and lower the platform to accommodate different sized containers. The height of the platform support structure can be varied by rising and lowering the platform support structure 520 within tower 550 via guiderails 560 and 562 and gears/pulleys and a suitable motor etc. (not shown). The tower structure itself can be moved (and hence move platform support structure 520, and consequently the container 10) in the y direction via guiderails 530 and 540 via gears 545 and 546 or other means. Similarly the structure can be moved in the x direction via guide rails 505 and 510 and gears 512 and 514, again powered by a motor not shown. Accordingly, the container 10 which rests on plate 12 can be moved to a location below whatever bin contains the selected product via a controller as will be discussed below. Of course it should be appreciated that alternative robotic structures can be utilized to move the container, including a robotic arm, conveyor belt or some other kind or movable structure controlled by the controller to position the container under the appropriate bin.

Figure 6:
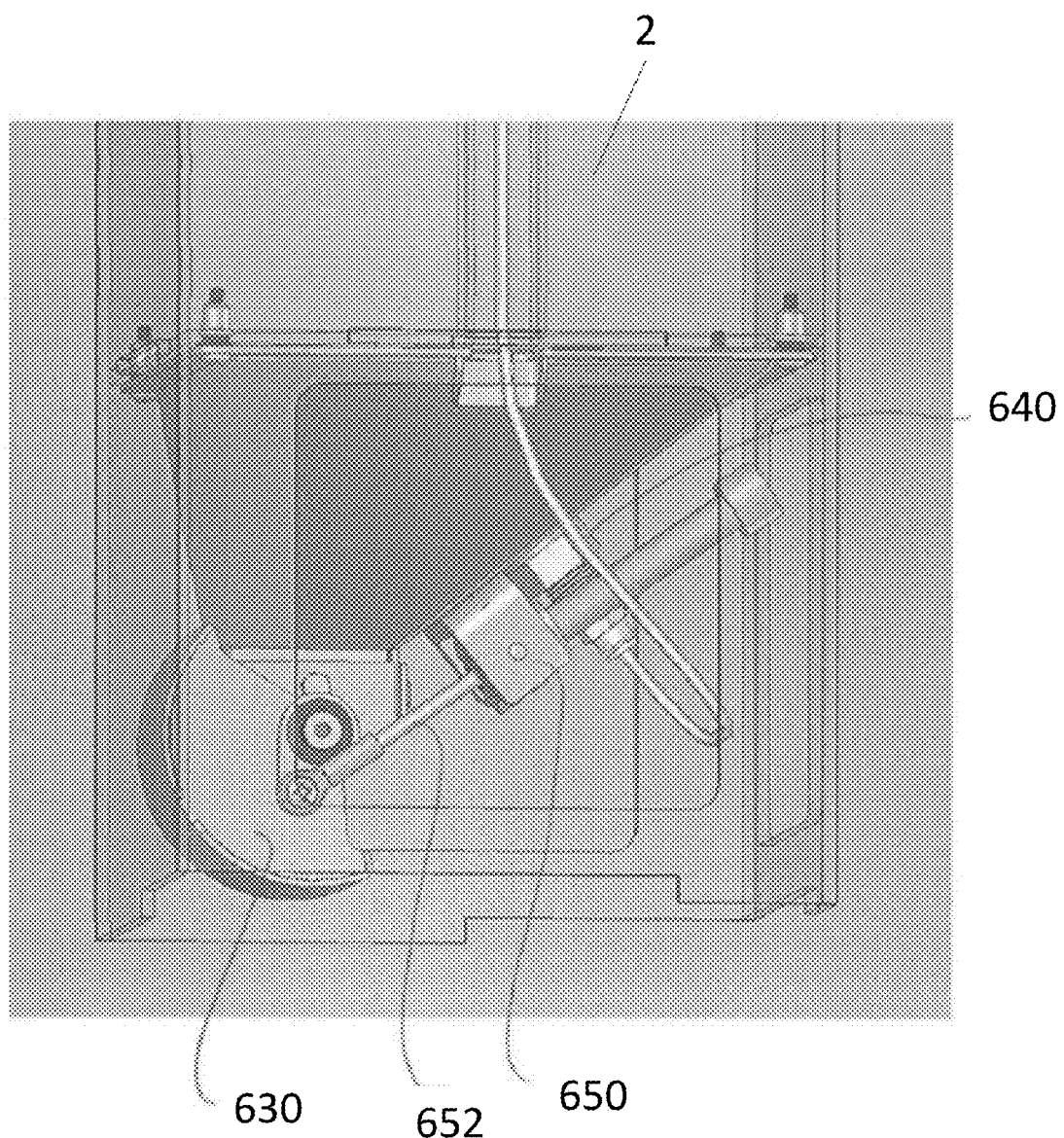
FIG. 6 is a schematic front view of a dispensing mechanism for a bin of the dispenser, according to an exemplary embodiment of the invention.
Figure 7:
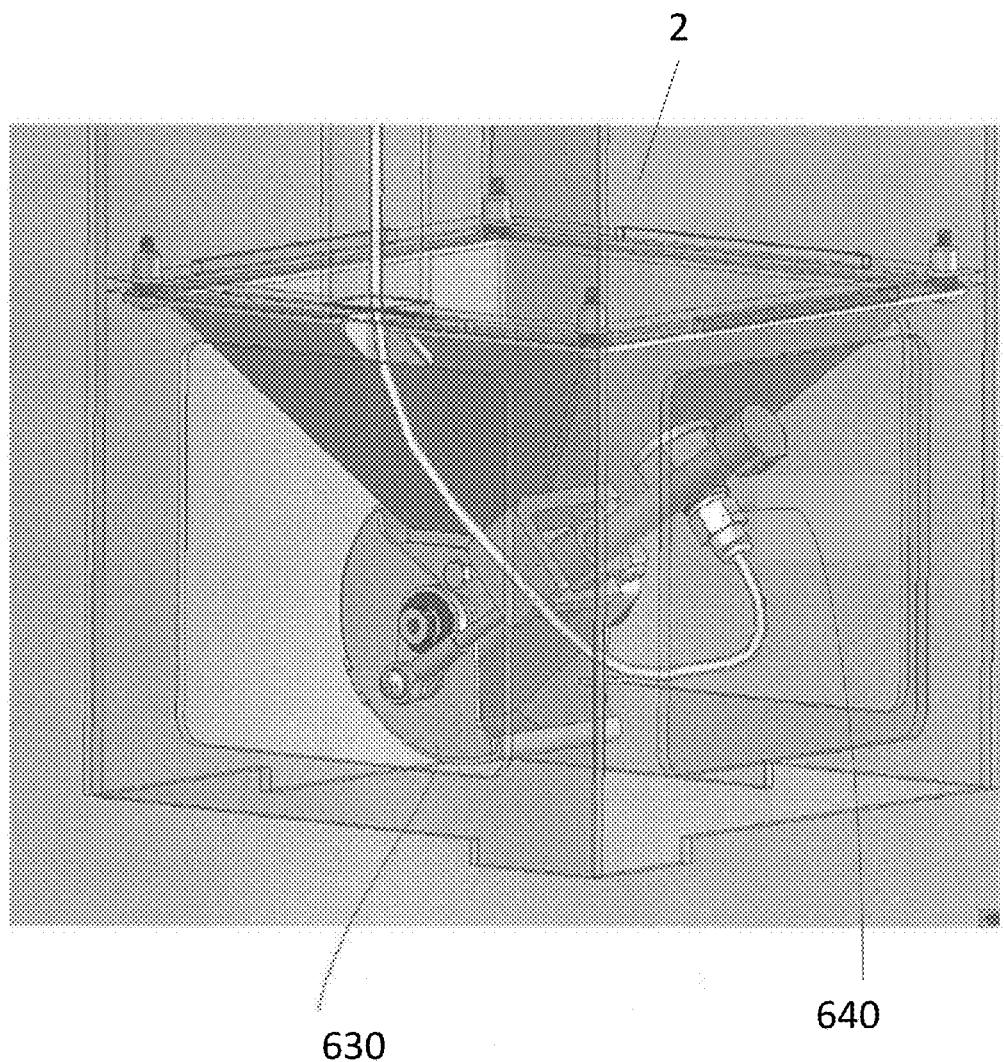
FIG. 7 is an isometric view of the dispensing mechanism of FIG. 6.
Figure 8A:
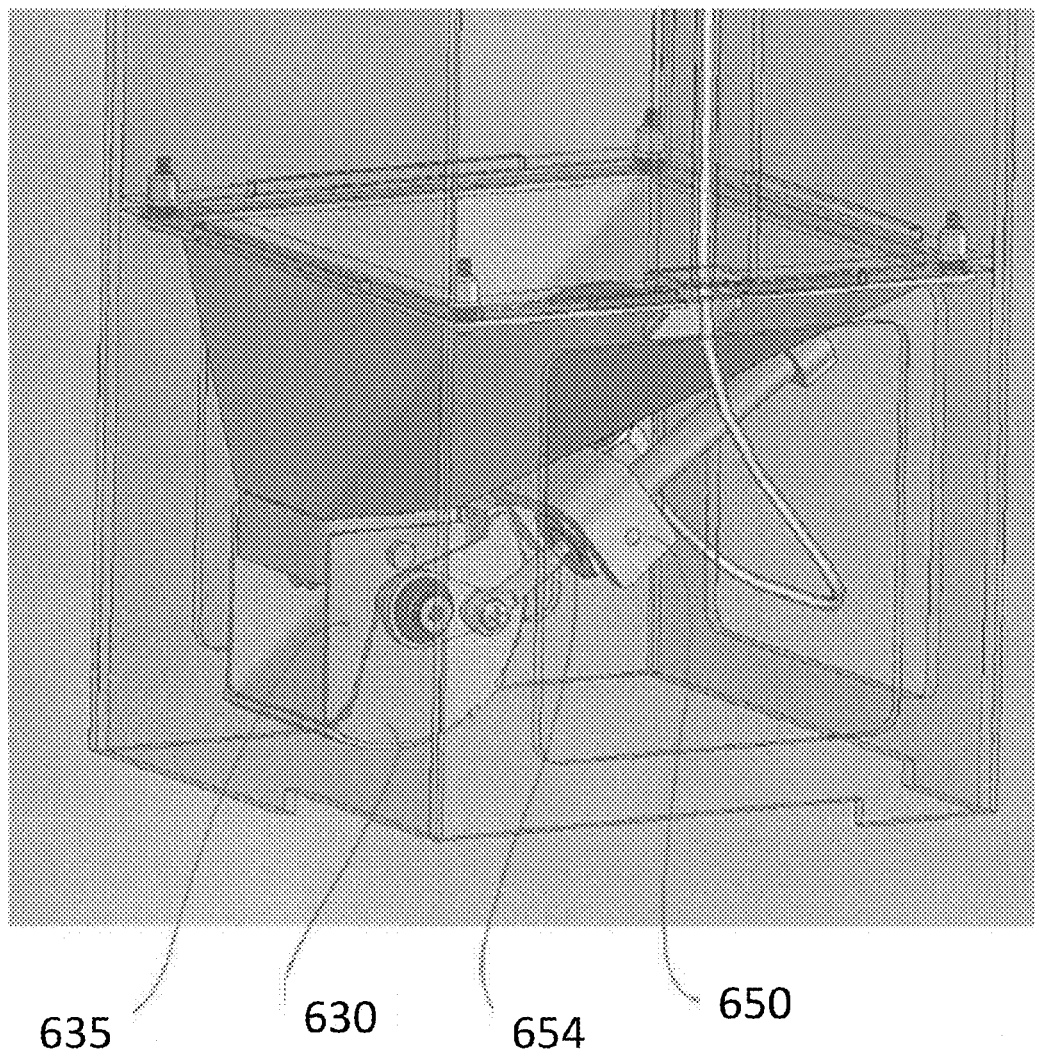
FIGS. 8A and 8B illustrate schematically the door, of the dispensing system of FIGS. 6 and 7, in the opened and closed positions respectively.
Figure 8B:
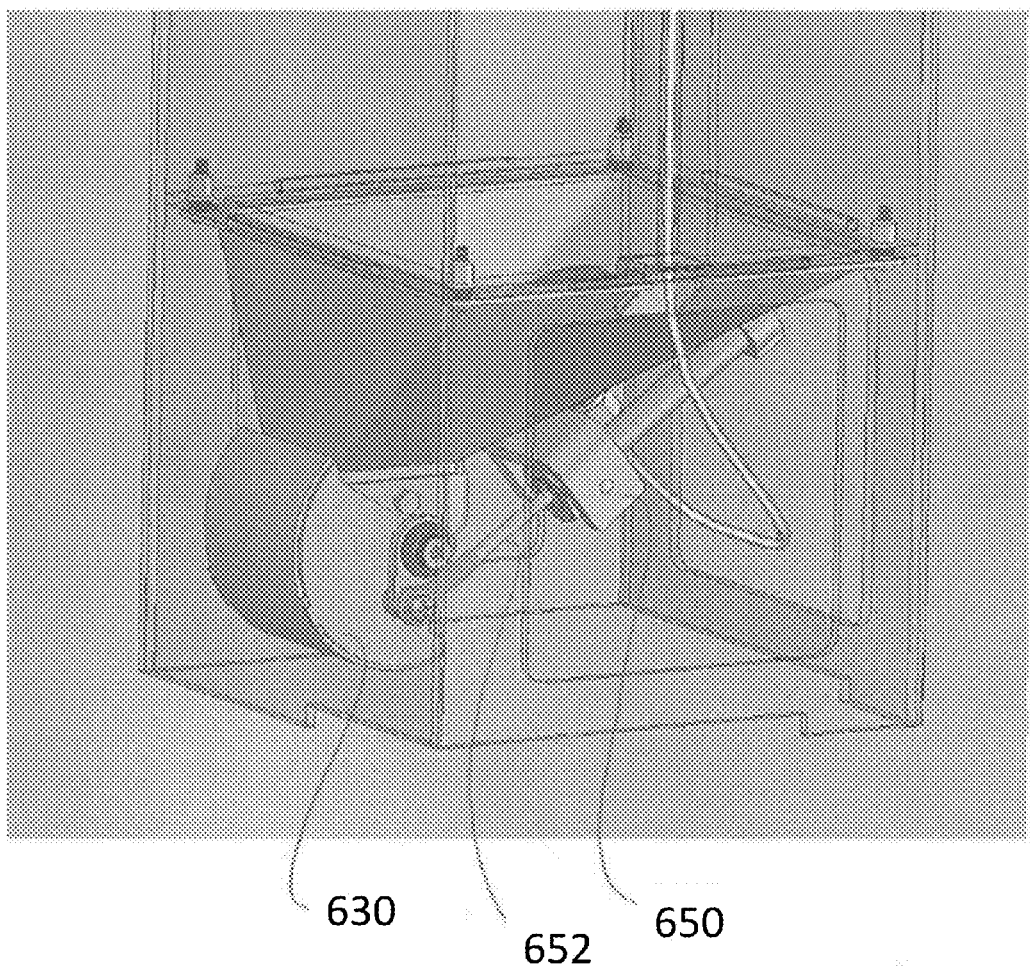
Figure 18:
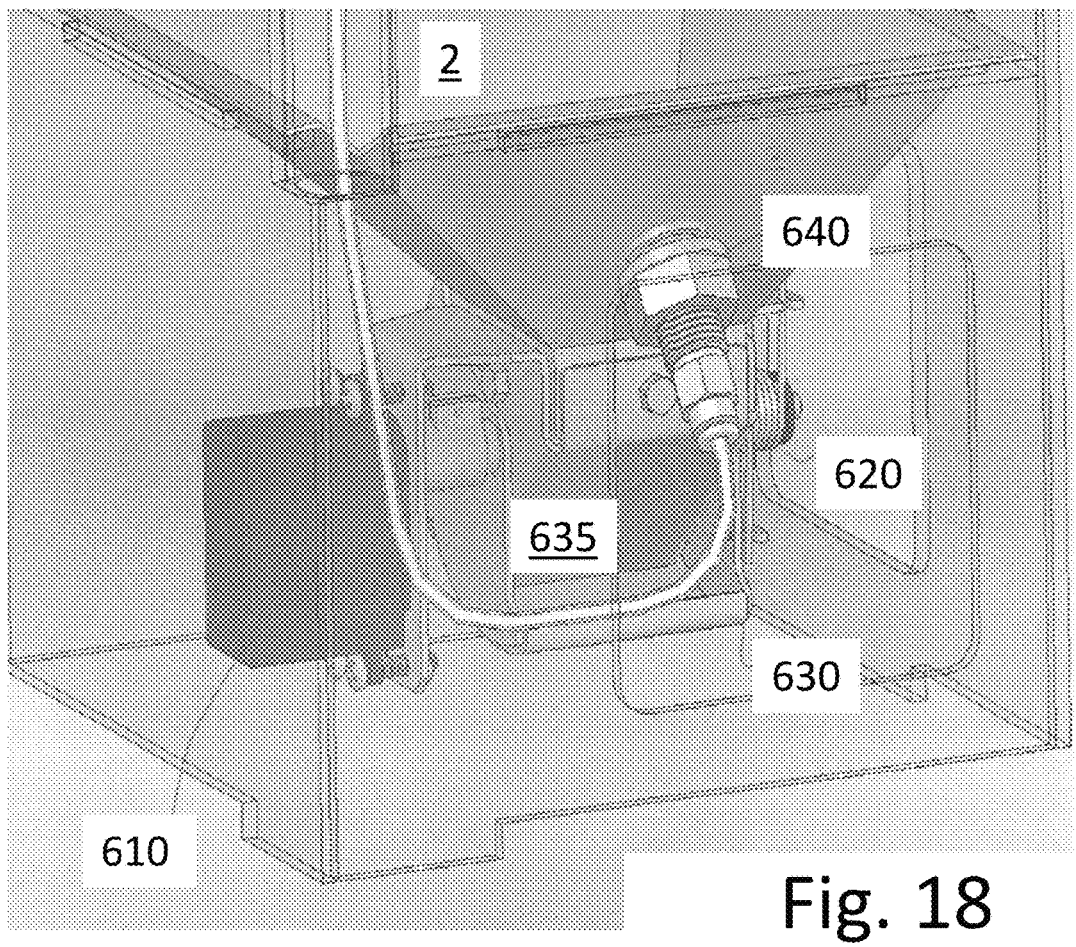
FIG. 18 shows a dispensing mechanism of an alternative embodiment.

Once the container has been properly aligned to receive the selected product, a dispensing mechanism is activated by the controller to dispense the product into the container. An exemplary embodiment of such a dispensing mechanism is illustrated in FIGS. 6, 7, 8A and 8B. FIGS. 6 and 7 illustrate bin 2 having a funnel shaped bottom, to which a chute 635 is attached. Rotating door 630 seals the chute, which is opened by a retractable cylinder assembly 650 with a retractable cylinder shown in the extended position 652 as rotating door 630 is closed in FIGS. 6 and 7. Depending on the product texture, size or other properties, an agitator 640 may be utilized to help dispense the product through shoot 635 into container 10. However alternatives include a bin aerator or bin vibration, for example. FIGS. 8A and 8B illustrate the door 635 in the opened and closed positions respectively, with the retractable cylinder shown extended 652 when opened, and retracted 654 when closed. The cylinder is retracted typically via pneumatic pressure, hydraulic pressure, or motor (control links not shown). There is a mechanical spring keeping the door normally closed (not shown, but which can be seen in the alternative embodiment illustrated in FIG. 18), or a spring embedded in the cylinder or a double action cylinder. It should be appreciated that many other dispensing mechanisms could be utilized, including screw conveyor, sliding door, a door which rotates in the horizontal direction, or the like. FIG. 18 shows one alternative, in which rotating door 630 is opened by a motor 610, and closed either by means of motor 610, spring 620, or both.

Figure 9:
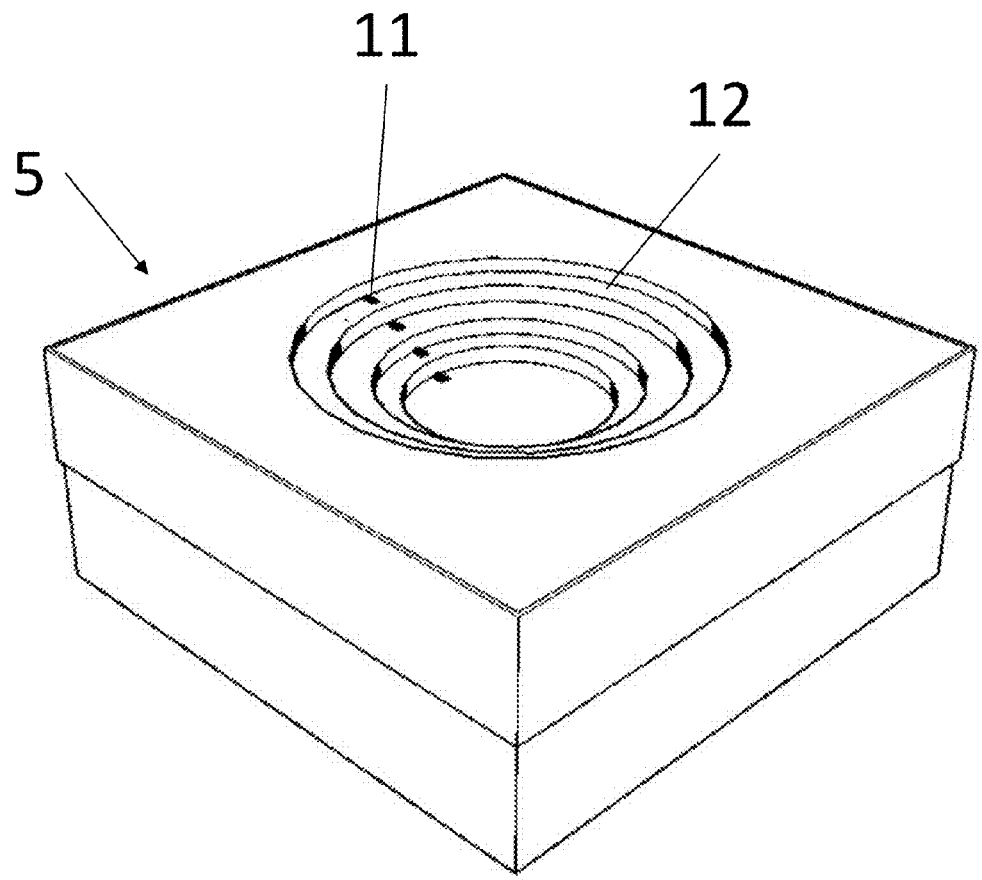
FIG. 9 is isometric view of a plate which aligns different sized containers on a scale via concentric guide grooves according to an exemplary embodiment.
Figure 10:
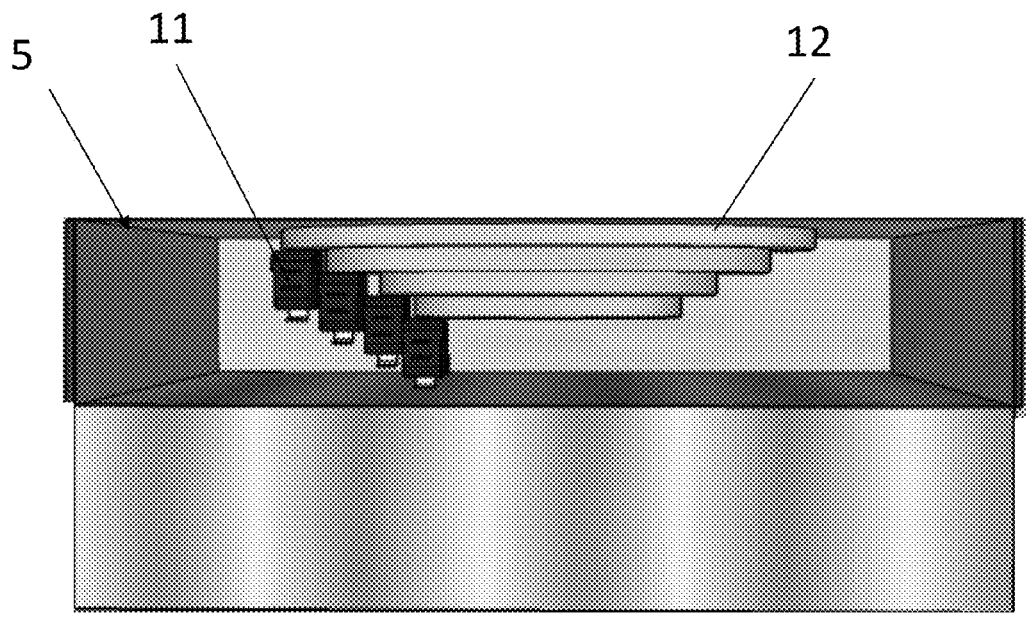
FIG. 10 is a side view of the plate of FIG. 9.

It is advantageous to allow for a plurality of different container sizes. Accordingly, some dispenser embodiments include placement means for positioning a plurality of types of containers such that the opening of each can be properly aligned with said dispensing mechanism. FIGS. 9 and 10 illustrate one such placement means, according to one embodiment. FIG. 9 is an isometric view and FIG. 10 is a side view of plate 12 which aligns different sized containers on scale 5 via concentric guide grooves. In order to detect proper placement, each groove includes a contact switch 11 which is activated by the placement of the appropriately sized container. In conjunction with the RFID reader, the controller can determine whether a container has been properly placed, so that the controller knows how to move the robot to align the container opening with the dispensing mechanism of the selected product. However, there are, of course, alternative placement means. As discussed with reference to FIG. 2, one such placement means is a proximity sensor (laser or infrared) for detecting the proper placement of a container. This can be used in conjunction with concentric guides. The guides allow for a set location of the container, so that the controller can be programmed with set positions (for example via table lookup) to move the plate 12 in order to align the container to receive each selected product. However, another alternative is to allow the customer to place the container on a plate without such grooves, and have the controller determine how to move to the plate, based on the container's actual location. In one embodiment, a laser or other sensor will notify the controller of the actual placement, so that the robot may be appropriately positioned.

A dispensing system according to another embodiment which is particularly suited to liquid products does not utilize a robot for moving the container, but instead uses an alternative alignment controller for aligning the opening of said container to a dispensing mechanism of a selected product. Such a system does not require the bulk product bins be located directly above the container during dispensing, which accommodates the usage of larger and heavier storage tanks which can be located in the second interior portion of the store.

Instead of a robot moving the container, the dispenser includes a flexible channel (such as a hose, tube or the like), associated with each product, and the alignment controller moves the flexible channel associated with the selected product to align with the opening of the container. According to such an embodiment dispensing mechanism for each product comprises a flexible channel, such as, a hose, tube or the like, each channel having a first opening connected either directly or indirectly to a bulk reservoir (tank) of a particular bulk product to be dispensed and a second opening, said second opening movable within said dispenser. The term indirectly in this context means connected to said reservoir by some mechanism that allow flow of said product into said flexible fluid channel, via valve, pump, gravity feed or other suitable flow controller. Upon receiving a request for dispensing a said particular bulk product, said alignment controller moves said second opening to a dispensing location aligned with the opening of said container. As will be appreciated, there are multiple ways of accomplishing the above. An exemplary embodiment is schematically illustrated in FIGS. 11, 12A and 12B.

Figure 11:
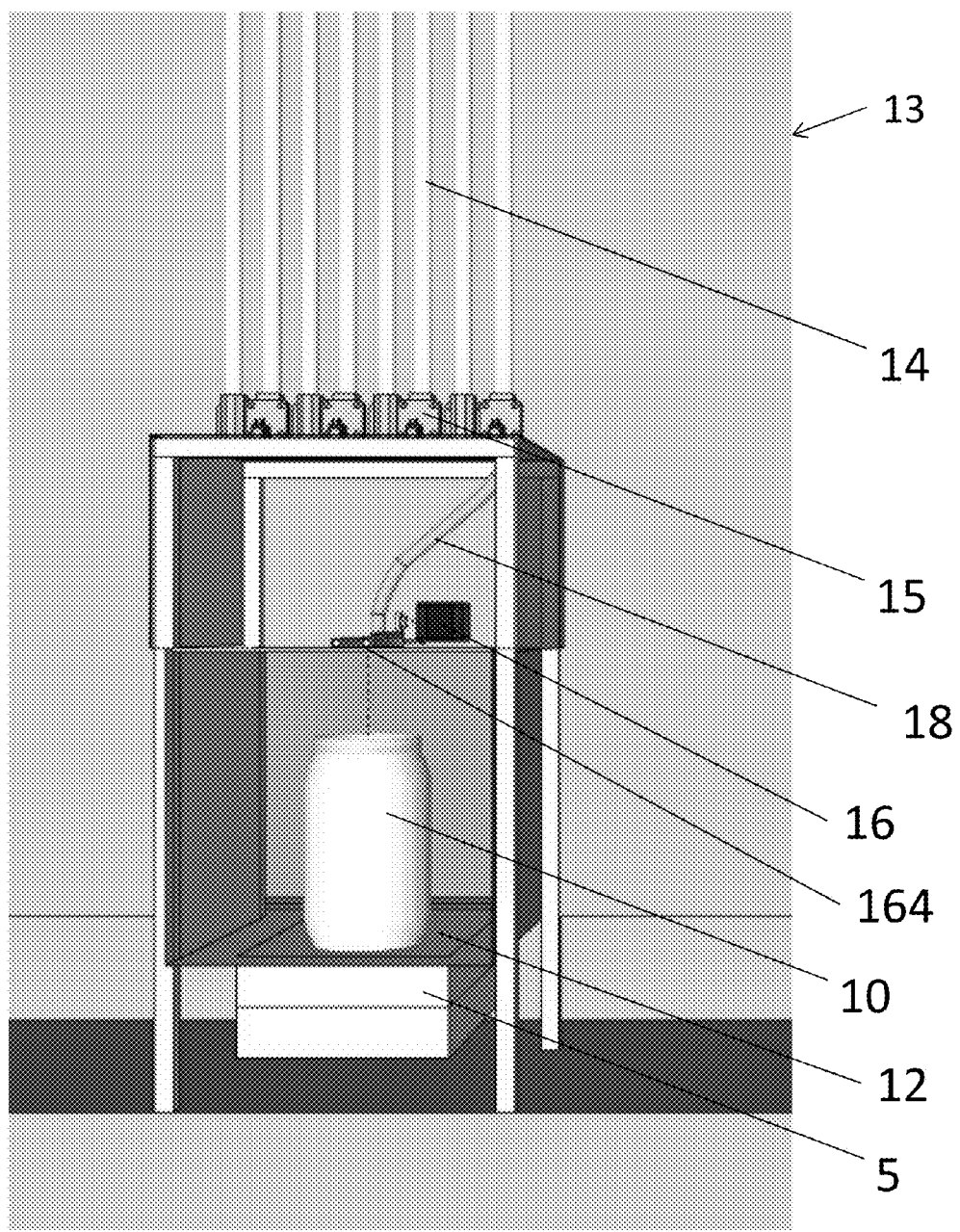
FIG. 11 illustrates schematically a front view of a liquid dispensing system, according to one embodiment.
Figure 12A:
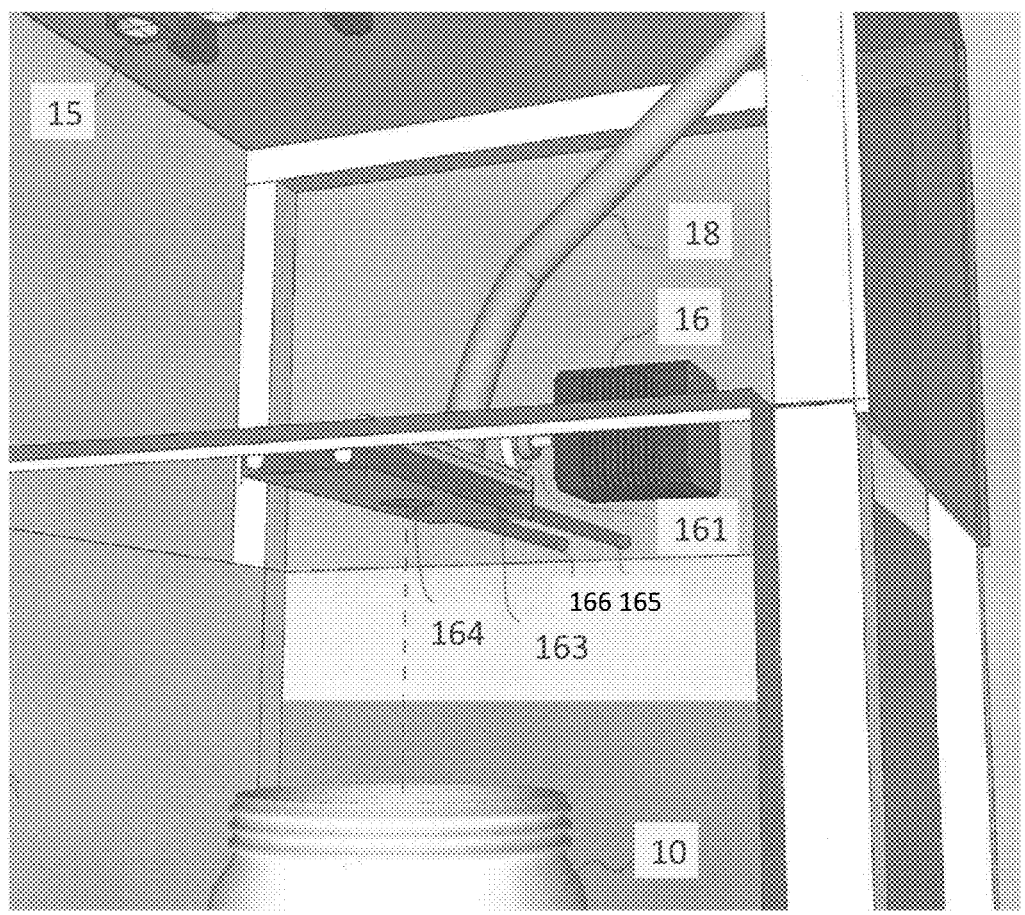
FIGS. 12A and 12B show different isometric views of the dispensing mechanism of the dispenser of FIG. 11, according to an exemplary embodiment.
Figure 12B:
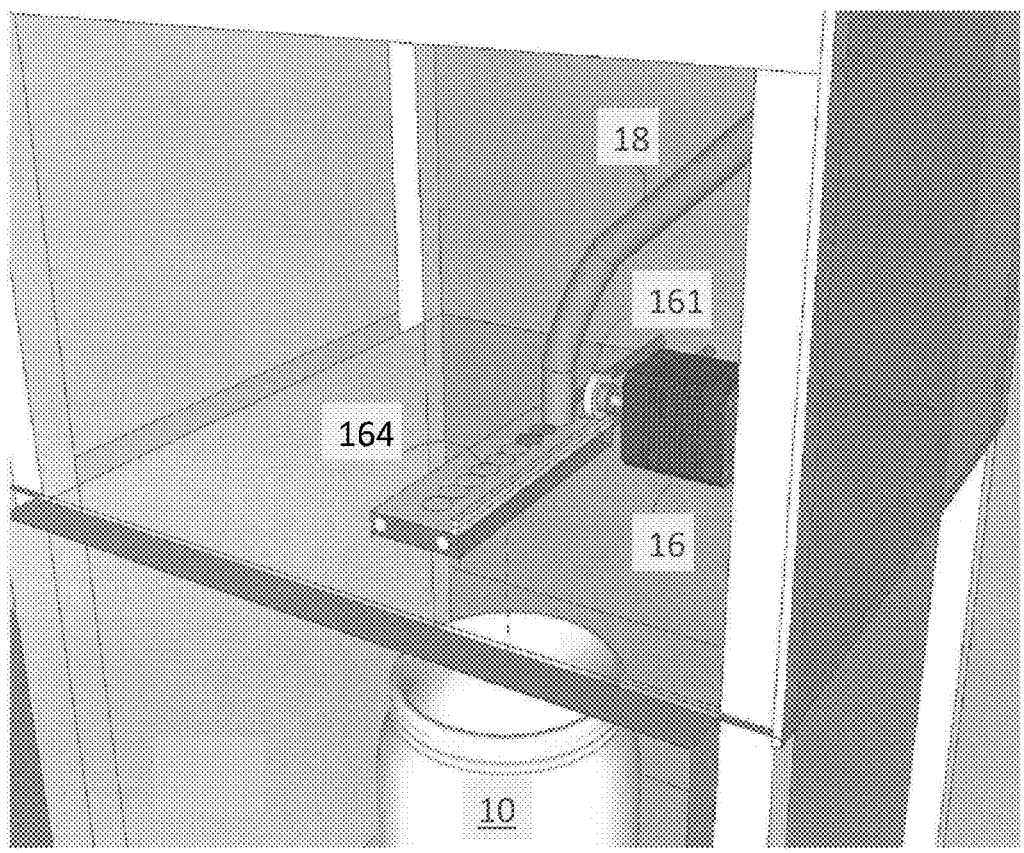

FIG. 11 schematically illustrates a front view of such a dispensing system, according to one embodiment. FIGS. 12A and 12B show different isometric views of the dispensing mechanism of the dispenser of FIG. 11, according to an exemplary embodiment. Note, only a single substation, for example substation 21 is illustrated, and other details, such as user interface 6, RFID reader 3 and printer 7 are not shown. The user still places a container on plate 12, which optionally rests on scale 5. Scale 5 may be omitted in situations where liquid products are sold by volume instead of weight. While most goods will be sold by weight, other systems could be used to measure liquid products, such as, pressure transducers, flow meters, level measurements, etc.

The plate 12 can still include concentric guides with micro-switches to ensure proper container positioning. Of course, a proximity sensor can be used instead. One of the main differences is the system shown in FIGS. 11 and 12A and 12B is the absence of the moving robot 9 for moving the plate 12, and the inclusion of linear actuator for positioning the opening of flexible channel 18, and optionally a nozzle affixed to the end thereof, with the opening of container 10. Note, only one flexible tube 18 is shown to avoid cluttering the Figure, but it should be appreciated that there would normally be one associated with each product. Each flexible channel 18, is indirectly connected to a respective bulk product tank or reservoir (located in second interior portion 90 behind wall 13, illustrated in FIG. 1) by an automated valve 15 (which may be electrical, pneumatic, or other), typically via product piping feed 14 (again, one per product). Typically fluid products are pumped into pipe 14 from their respective tank by pump (electrical, pneumatic, or other) not shown, but gravity feeds are possible depending on viscosity of fluid and other factors. Referring to FIG. 12A and 12B, linear actuator comprises a motor 16 and gear 161 for moving a bar 163 (to which each tube 18, or associated nozzle, is affixed) along guide rails 165 and 166, such that a dispensing opening 164 (one for each tube 18) is positioned above the opening of container 10. It should be appreciated that other mechanisms for moving a tube 18 over the container could be utilized, such as pneumatic actuator, pneumatic cylinder with predetermined positions, rotating disc with nozzles on the perimeter, for example.

Figure 13:
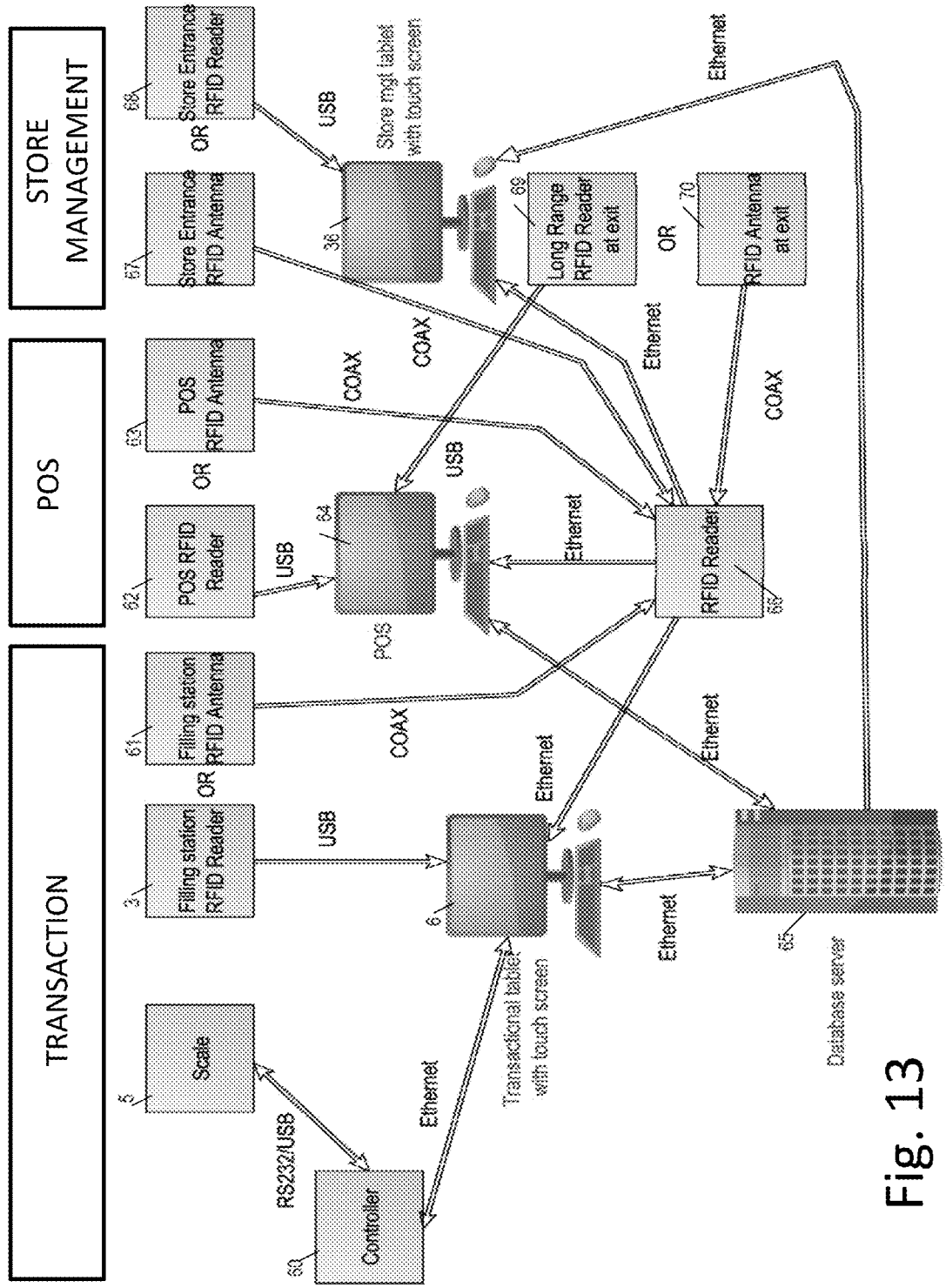
FIG. 13 is a block diagram illustrating communication interfaces between various components of a system within a store, according to an exemplary embodiment.

FIG. 13 is a block diagram illustrating communication interfaces between various components of a system within a store, according to an exemplary embodiment. The FIG. 13 is divided into 3 columns, illustrating transactional components (for the transaction of selecting and dispensing a product), Point of Sale (POS) components (for a checking out dispensed products) and optional store management components, for directing users to various dispensers within the store.

It should be noted that each dispenser is controlled by a controller (including at least one processor, and computer readable medium for storing software instructions for carrying out the methods and features discussed herein) which may form part of the dispenser or control the dispenser remotely via a suitable communication interface. The controller includes several blocks or components, which can be implemented using a variety of hardware and software components: a UI controller, for interfacing with the customer; an alignment controller, for controlling the mechanical components (e.g., motors, valves, etc.,) used for dispensing; and a database component, for communicating with database server 65, etc. Further, a shared controller (for example in database server 65) can implement some or all of these functions for a plurality of dispensers, or even for the entire store.

The controller can be divided, as shown in the exemplary embodiment shown in FIG. 13. Accordingly, alignment controller 60 is shown separate from the transactional tablet with touch screen 6, which itself includes a processor, and machine readable memory for storing software instructions. The alignment controller is in communication with that tablet computer 6 and the scale 5. The transactional tablet 6 receives input from the scale 5 (either from the controller 60, or directly from the scale via a connection which is not shown), the RFID reader 3 and its built-in touch screen (the UI) in executing the methods discussed herein. However it should be appreciated that a tablet computer could act as the controller for the dispenser, given sufficient memory, processing power and UI ports. Put another way, the tablet could include a software block for interfacing with and controlling the robotic assembly 9 and for controlling the mechanical dispensing, e.g. for controlling motor 610, retractable cylinder 650 and agitator 640. (The latter elements are not shown in FIG. 13.) Note, the physical connections illustrated are all exemplary and different connections, including wireless connections, could be utilized. The dispenser can include RFID reader 3, or a RFID antenna 61, in communication with a shared RFID reader 66.

A POS station 80 includes a checkout station 64 which includes a user interface and a controller, which may be remote and/or shared. The POS also includes its own RFID reader 62, or a RFID antenna 63, in communication with a shared RFID reader 66. The POS function (payment for items dispensed) could be facilitated by a dispenser. However, this could cause line-ups at the dispensers, and depending on the payment technology utilized, credit/debit card readers, increasing the cost of each dispenser. Further, in many jurisdictions, the price charged for food items sold by weight must be measured by government approved scales, which can be significantly more expensive than the cost of cheaper but suitable scales 5 which can be utilized at each dispenser. In such jurisdictions, the POS 80 also includes such a legal for trade scale (not shown), for setting a final price.

Depending on store size and expected throughput, the store may include some or all of the components shown in the store management column. In order to prevent theft, or inadvertent non-payment, the store can include either RFID reader at the exit 69, or a RFID antenna 70, in communication with shared RFID reader 66, for scanning containers as they exit to ensure payment was made for all containers. Similarly the store can include greeting station 35, including a transactional tablet with touch screen UI 36 (which includes its own controller, or is connected to a shared controller), and either store entrance RFID reader 68 or store entrance RFID antenna (in communication with shared RFID reader 66).

Further, it should be noted that the database server 65 could include more than one server. Indeed, it would be possible to have a local server in each retail establishment, in communication with a central server which tracks information useful for a plurality of such retail stores. An exemplary scenario would have the local server manage the following:

Refilling operations
Transactions
RFID communications
Display information

In such an exemplary embodiment, a centralized corporate server (not shown) would manage the following:

Product information (including pricing)
Container details
Client profiles

In such a scenario, a local server will autonomously serve clients and manage operations. Updated databases will be sent to the corporate servers on an ongoing basis. Corporate servers will manage products, clients and containers. The information will be needed to determine the best suited bulk size to have for each store, as the bulk product quantity could differ from one region to another. This will have an impact on the supply chain. Store sales will also be uploaded frequently to the corporate servers, which will give up to date sales results. It will be possible to adapt pricing depending on the store location and market analysis.

Figure 14A:
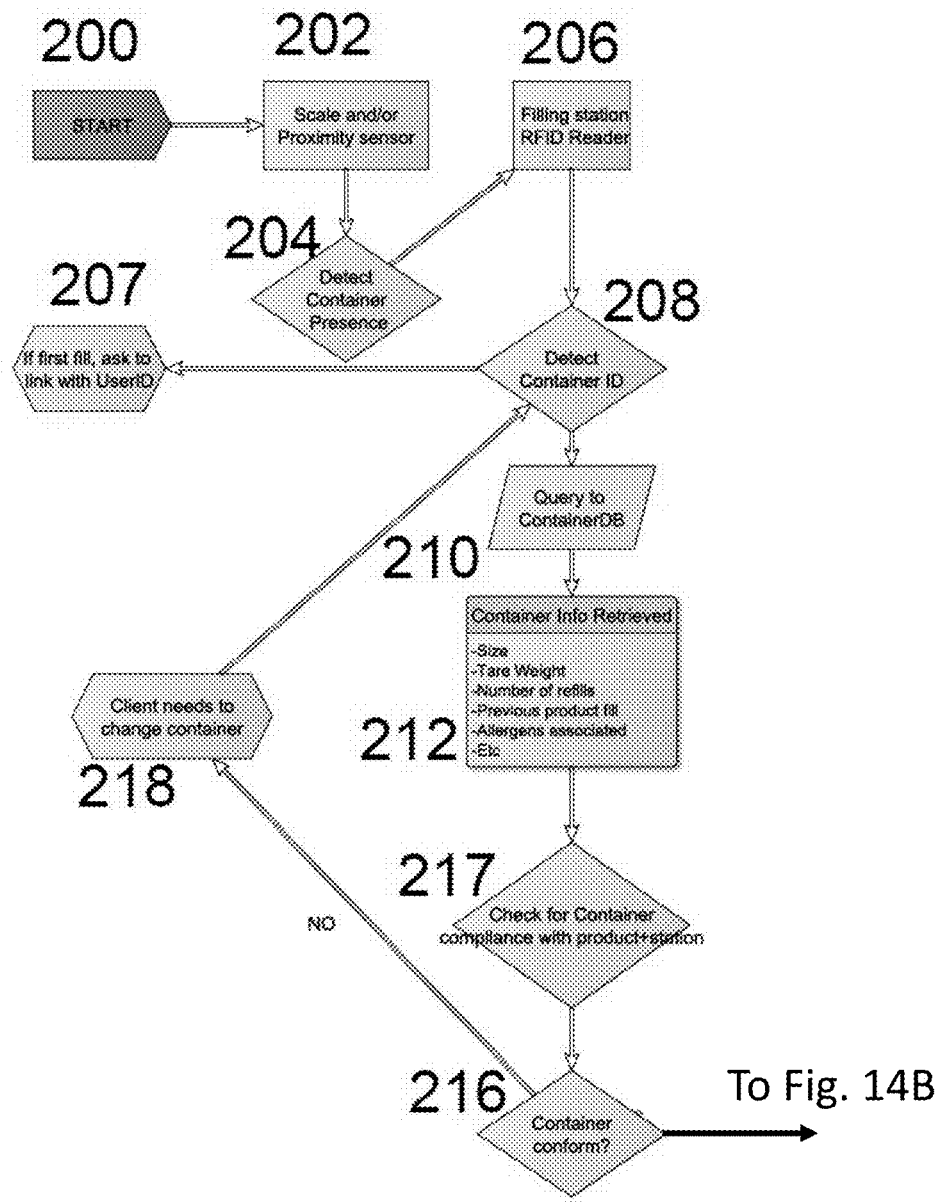
Figure 14B:
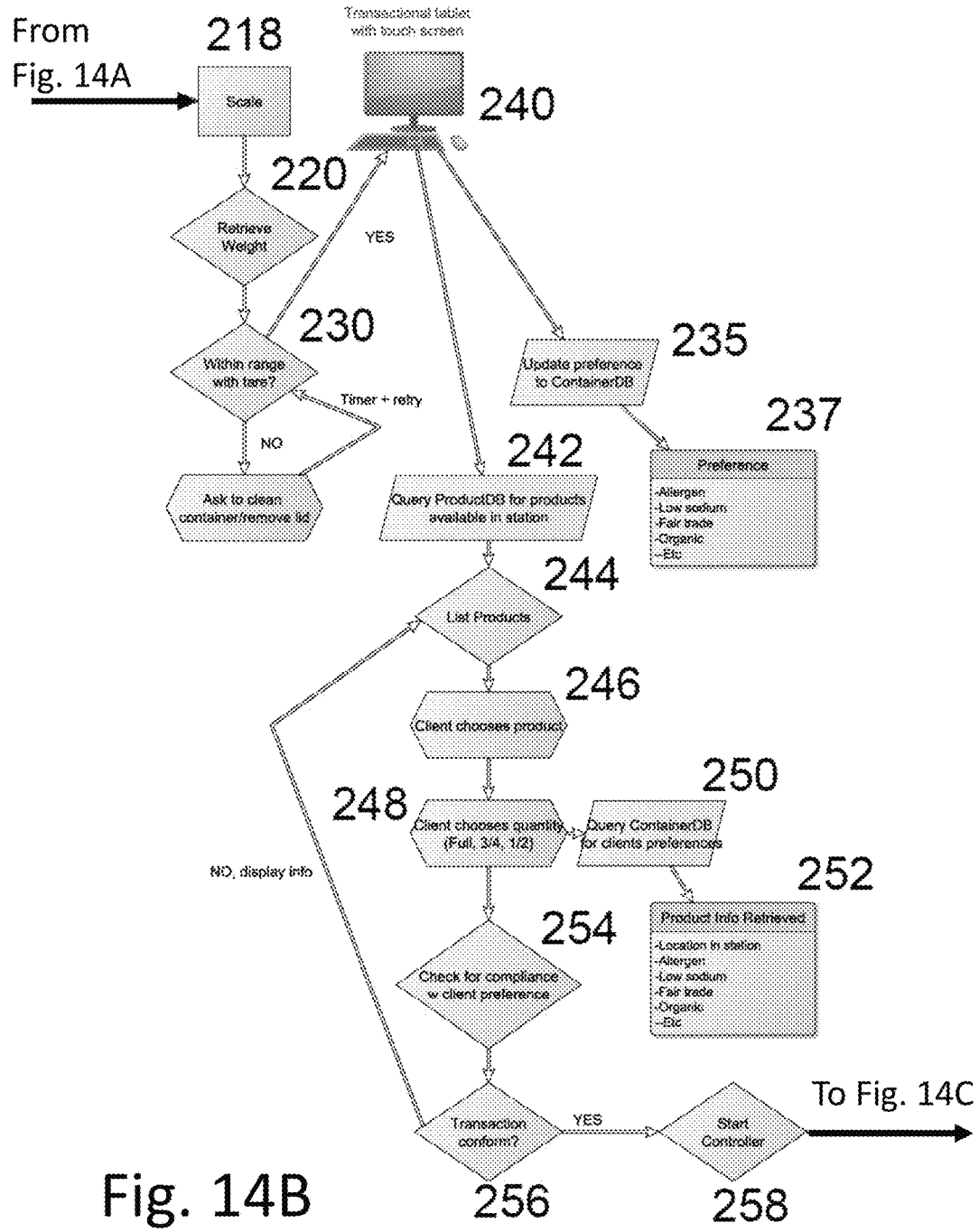

FIGS. 14A, 14B, and 14C show, respectively, parts 1, 2 and 3 of a flowchart illustrating an exemplary process executed by a dispenser controller for a dispensing transaction, according to an embodiment. Part of the process is executed directly by transaction tablet computer 6, and part by alignment controller 60 (see FIG. 13). FIGS. 14A and 14B illustrates steps comprising database lookup and compatibility checks to facilitate a product fill request, which are primarily executed by a processor of the tablet computer 6. FIG. 14C illustrates steps comprising the dispensing operations to satisfy the product fill request, which are primarily executed by a processor of alignment controller 60. However, which steps are executed by which processor is primarily a design choice. As stated the dispenser could be controlled by a single controller which includes the functionality of the transactional tablet computer 6 and the alignment controller 60 and accordingly executes all of the steps. Looking at FIG. 14A and 14B, a transaction starts 200 with a customer placing a container 202 on the plate/scale, which is detected 204 by either or all of the scale 5, proximity sensor 4, or micro-switch 11. The container ID 208 is detected 206 by the dispensers RFID reader 3 or 61.

Once the container ID is determined, the controller sends a query 210 to the container database (which resides on database server 65). The query returns a number of parameters 214, including container size, type, tare weight, number of refills, previous product fill information as well as user information such as user allergies and preferences. A query 207 for a user ID may be made if a first fill for a container ID is detected.

The controller than performs a compatibility check 214 to ensure the container can be used at the dispensing station. For example, the dispensing station may be configured to only accept containers designated for dry goods, and containers configured for liquid products would not be authorized. This may depend on the size of the containers, and whether the container can properly fit in the guides of plate 12. If the container is not compatible with the station 216 the UI 6 displays a warning to the user that the container cannot be used at this station and that another container should be used.

Assuming the container is compatible with the station, the system will weigh the empty container 220 placed on the scale 218 and compare with Tare (empty) weight for the container 230. If the container weighs too much, the system will ask the user 232 to remove the lid or to empty and clean the container (possibly at a store container cleaning station (not shown)) before proceeding.

Assuming the container is acceptable, the system allows the user to update 235 their preferences 237 for the container. Then the controller will query the product database 242 to determine and list 244 the products available at the station. While options exist to not query the product database for each transaction (e.g., this could be done on a daily or other basis), an advantage of doing so each time a transaction starts, is to allow for real time display of available products. For example, if a product bin was emptied in a previous transaction, the system will not show it as available until it is replenished. In some embodiments the system will contrast product characteristics of each product capable of being dispensed at the station with the user preferences, and preferentially highlight the compatible products (or omit altogether the non-compatible) products. In addition, the user preferences can determine what type of information is displayed (e.g., sodium content, whether organic, fair trade, etc., along with pricing).

The client will then select the product 246 and the quantity (for example by weight, or fraction of container) 248 of the product to be dispensed, creating a product fill request. The system queries the container database for client preferences 235 and in conjunction with the earlier product query 242 retrieves product information to compare with the customer preferences. The controller initiates a compatibility check 254 to verify the compatibility of said product fill request with said container by verifying the product requested satisfies restrictions based on information associated with the container. For example, it may query whether or not the product requested is compatible with the contents previously placed in the container. For example, if a customer has 3 containers with them (known, for example via greeting station 35), one previously filled with spices, and one previously filled with candy, and they request a candy item to be dispensed in the container previously filled with spices, the system can ask the user if they wish to use the container previously filled with candy. Further, a warning is displayed if the product characteristics contravene the user preferences. For example, the user is notified if an identified allergen (i.e. identified by the user in the user preferences) is present in the selected product, or if the user requested a non-organic product but has a stated preference for organic products and an equivalent one is available to be dispensed. If the compatibility check is passed 256, the alignment control operation is commenced 258. Otherwise, a warning is displayed, so that the user can change the product requested, or change the container, or confirm the request.

It should be noted that many variations can be made. For example the user can first select the product, then place the container. In which case compatibility check 254 can be combined with check 214.

It should be noted that the steps carried out in FIG. 14A and 14B are independent of whether the product to be dispensed is a dry good (for example, via a dry product dispenser as shown in FIGS. 2 to 4) or a liquid product (for example via a liquid product dispenser as shown in FIGS. 11, 12A and 12B). However, the alignment controller and dispensing mechanisms operate differently depending on the type of dispenser, as illustrated in FIG. 14C.

For a dry product 260, the alignment controller closes the dispenser access door 262 and positions the container via the robotic assembly 264. For example, part of the product information retrieved at step 252 is the location of the bin in the dispensing station. This location will typically be in the form of co-ordinates, and the controller will move the container so that the container opening is aligned with the co-ordinates of the selected product. The container is filled from the bin 266 by opening bin door 635 under a control operation 268 for either a set period of time or based on ongoing readings from the scale. The control operation 268 can facilitate dispensing by activating the bin aerator 640 or by other means. The scale determines 272 whether sufficient product has been dispensed, and if not 270, the filling operation continues. Once sufficient product has been dispensed, the controller closes the bin door and repositions the container 274 before opening the access door 276 so that the user can remove the filled container. If the container is being refilled with the same product, the user can stipulate (in response to a system prompt) that they do not need a label printed 222. Otherwise the dispenser printer 7 prints a label listing product characteristics for the user to affix to the container.

Finally the transaction database is updated 228 indicating the quantity of the product dispensed, and optionally other information useful for real time inventory management. Thus, a real-time inventory database for all products is maintained by adjusting said database each time a product is dispensed. Accordingly, the system can automatically order additional inventory when the amount of a product reaches a threshold. Optionally the transaction database stores information regarding product selection on a per-product and per-user basis, which can be provided to suppliers as feedback as to related purchases. For example, a supplier may want to determine the interest for a new product. The new product would be made available to the clients. As all the transactions track the unique container ID (which is linked to a user), the system can track each transaction of the new product and subsequent transactions involving repeat clients. Thus, client loyalty to the new product (at least in terms of repeat sales) can be tracked. This information can be given back to the supplier, helping it to do market research and giving it a value that it would not gain from conventional stores. Further, other information about repeat clients can be tracked and provided, as to what other products are purchased by repeat clients, which can be used to provide cross selling opportunities. For example, a coupon for product Y can be given to purchasers of product X, if a correlation is determined. The coupon which can be electronic (displayed on UI representing a discount applied) and/or printed at the dispenser, can be based on a type of product. For example, in order to promote a brand of conditioner, a coupon/discount can be offered every time a client dispenses a shampoo which does not already contain a conditioner. Further, the ability to offer discounts can be used to help encourage sales based on current inventory levels. For example, the product database keeps track of the amount of product in the bins. It is also aware of any replacement bins waiting in storage (for example, received and waiting in secondary interior portion 90). Should a bin be almost empty and a replacement bin is ready, the system can offer a discount to users to encourage them to purchase that product, so that the bin can be replaced.

For dispensing of a liquid product 280, the alignment controller closes the dispenser access door 282 and positions the dispensing nozzle of the selected product over the container. For example, part of the product information retrieved at step 252 is the location of the nozzle in the dispensing station. The controller will move the nozzle, for example via actuator 16. The container is filled from the tank 286 by opening the appropriate valve 15 (and operating a pump, if necessary) under a control operation 288 for either a set period of time or based on ongoing readings from the scale. The scale determines 292 whether sufficient product has been dispensed, and if not 290, the filling operation continues. However, as stated previously, pressure transducers, flow meters, level measurements etc., can be used instead of, or in conjunction with, a scale for liquid products. Once sufficient product has been dispensed, the controller closes the valve 15 (and disengages the pump if used) and opens the access door 294 so that the user can remove the filled container. The printing step 222 and database update 228 operations are the same as described above.

Figure 15A:
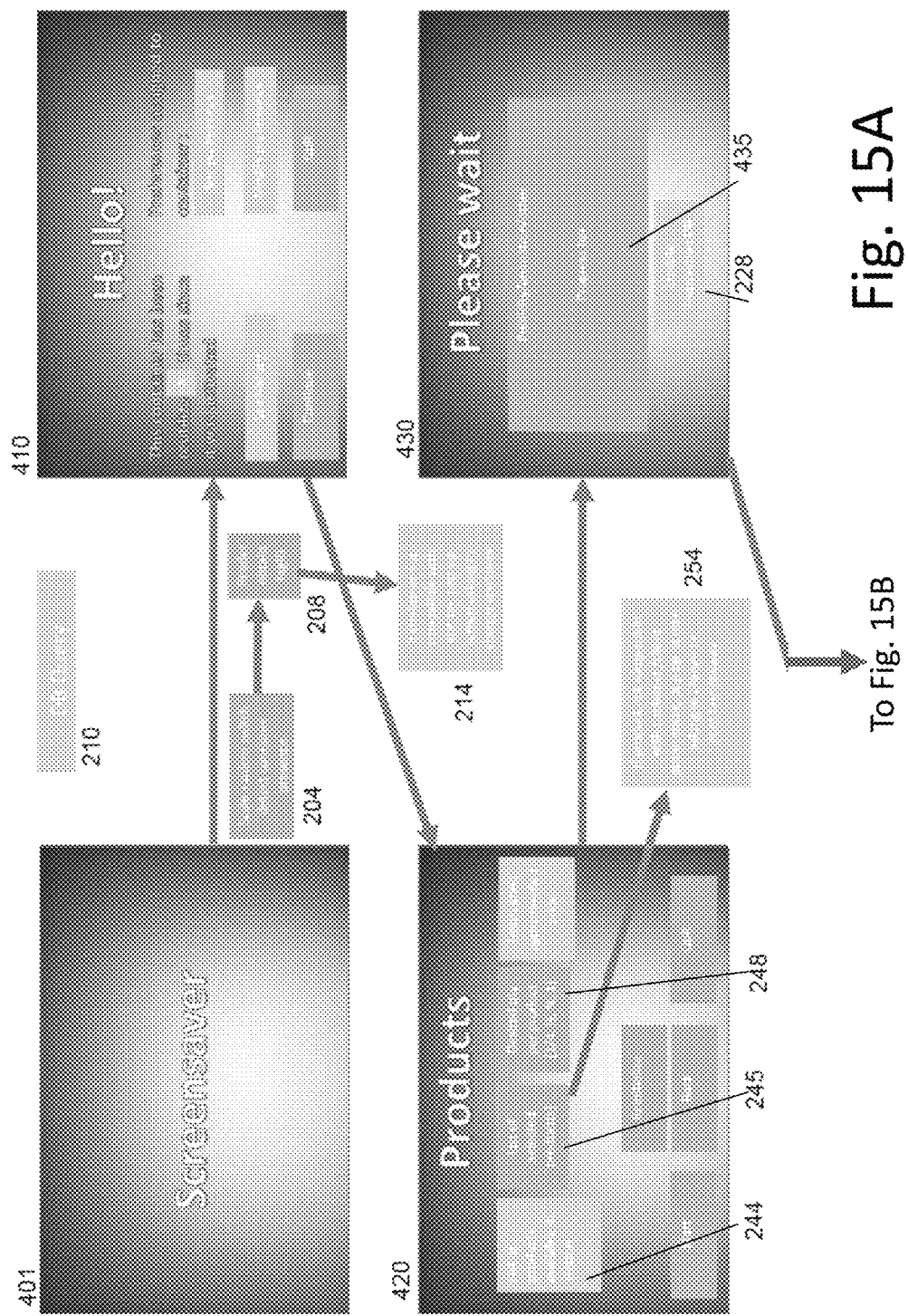
FIGS. 15A and 15B illustrate schematically a dispensing transaction with UI (User Interface) screen shots, according to an exemplary embodiment.
Figure 15B:
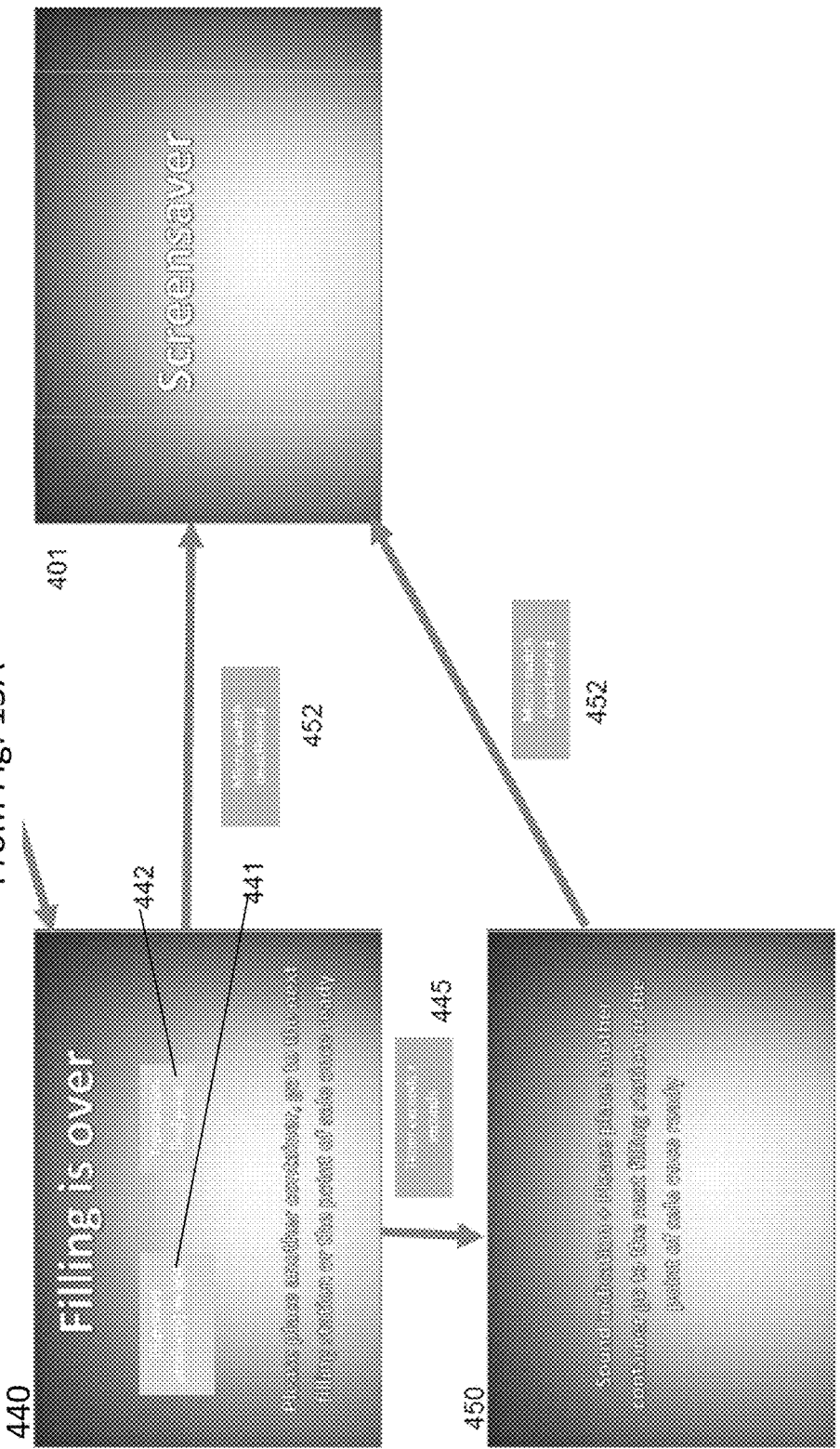

FIGS. 15A and 15B illustrate schematically a dispensing transaction with UI screen shots, according to an exemplary embodiment. As shown in FIG. 15A, the dispensing station UI screen 6 will normally have a screensaver 401 when the station is idle. The screensaver could alternate images with a notice to place a container in the dispenser to start. The screensaver could display useful information or advertising. Once a container is detected 204 and the ID tag is read 208, a greeting screen 410 will normally be displayed. However, should the container not be compatible with the station 214, a message will be displayed advising the user and asking the user to replace the container. If the user does not have another container, the controller asks the user if they would like to purchase another container, and if so, activates an additional container for the user.

The greeting screen 410 can display a variety of information to the user, and provide choices for the user to select. For example, the UI 6 can display the number of times the container has been filled, and allow the user to request the fill history for the container. The greeting screen can also offer to display and modify the user preferences, should the customer so wish. The user would be presented an option to continue to the product screen 420.

The product screen allows the user to view a list of products available in the substation (244). In some embodiments the controller includes access to a product database and a user information database, and is configured to review product characteristics of all products capable of being dispensed, compare those characteristics to user preferences (including allergy information), and highlight to the user through said user interface compatible products.

The user will then select a product to be filled, and once selected indicate the quantity 248 and request a price estimate 422. The price estimate is simply a calculation of the cost/unit times the number of units (e.g., grams) requested. The controller will do a database lookup to estimate the number of grams per each fraction of the container. If desired, a warning message can be displayed that the final cost will be determined based on the actual amount dispensed. In some embodiments the dispensing station is configured to dispense a plurality of goods, so that the customer can mix and match one or more products into the same container, for example, to make their own version of trail mix. In response to the user requesting a plurality of goods to be mixed into said container, the controller is configured to calculate the cost of the mixture based on the amount of each product to be dispensed. The system offers to display the selected product(s) 245 prior to dispensing, so that the customer can confirm their selection before the product is dispensed. Before dispensing, the controller checks the product fill request is compatible with the container 254, as discussed above. If not, a pop-up screen is presented to the user to give the user the option to change the request, change the container, or continue anyway.

While the product is being dispensed, a please wait screen 430 is displayed. Such a screen could display a progress bar as the container is filled and/or present advertising or other media to the user 435. In some embodiments, the system includes media content controller for displaying media content (e.g., advertising, information, entertainment) to the user selected based on the customer's preferences and/or prior or current purchase(s). Of course such targeted information can be displayed once a user (through reading a container's ID tag) is detected, either on the UI 6 or the display screen 17. After dispensing, the Transaction database is updated 228.

Referring now to FIG. 15B, a "filling is over screen" 440 is displayed, showing the actual dispensed product(s) weight 441 and price 442. The user is then prompted to go to the POS (or fill another container). Should the user not collect (detected by micro switch 452) their filled container after a preset duration 445 a sound alarm and display 450 is presented to prompt them to proceed to the POS (or fill another container). Once the micro-switch is deactivated 452 (although the system can be configured to sense removal of container based on scale weight, proximity detector, etc.), the system reverts to the screensaver 401 indicating the dispenser station is ready to dispense again.

It should be noted that if the user has selected to fill the container with multiple products, the control operation 268 would initiate a loop back from step 270 to step 264 in the flowchart shown in FIG. 14C for each product selected. The amount to be dispensed can easily be measured as the scale checks the weight 272 of container during the dispensing of each product. It should also be appreciated that this has an advantage over conventional bulk retailers, which could only allow mixing of products if they had the same cost/weight. This is not a requirement in the current system. It should be appreciated that multiple products could be dispensed into a single container at different dispenser stations. The current filled weight of the container is stored in the transaction database and can be used instead of the tare weight at the next station. Compatibility checks 254 when mixing multiple products could then include warning as to differing expiry dates and as to incompatible products (while subjective, a warning can be displayed if someone tries to add dry mustard to a candy and nut mix, especially if they already have another empty container).

This ability to mix items offers a new capability to users: to fill a single container with a user selected mix of items, such as, multiple ingredients for a recipe. For example, should a customer wish to make a cake, they can put multiple ingredients (e.g., sugar, flour, cocoa, chocolate chips, baking soda, raisins), in their required amounts into a single container. What is more, the system can help facilitate this. For example a user can custom define a recipe, specifying the ingredients and their quantities. This recipe can be input, either online, at a greeting station or via a smart phone app. Then the custom recipe, or e.g. one downloaded from the Web, can be allocated to a container, for example, at greeting station 35. The greeting station can determine which dispensers contain the ingredients, and direct the user to a first dispenser containing including at least one of the ingredients. Each dispenser will read the ID tag of the container, query the container DB, determine a recipe has been allocated to it, and automatically dispense the defined amounts of each product it is equipped to dispense. It will then direct the user to the next dispenser, until all of the ingredients have been allocated.

Figure 16:
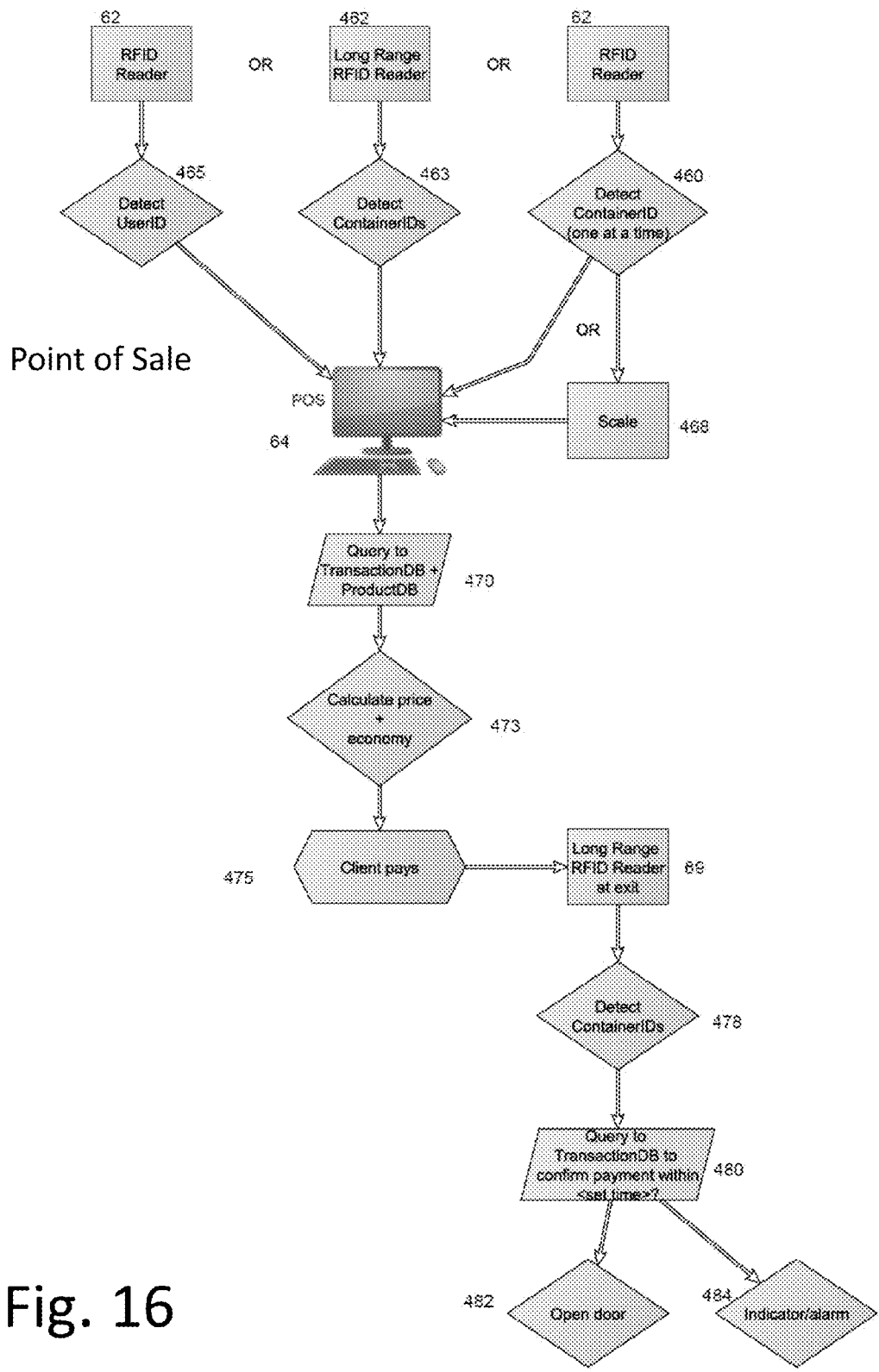
FIG. 16 is a flow chart illustrating a POS (point of sale) process according to an exemplary embodiment.

A flow chart illustrating a POS process according to an embodiment is illustrated in FIG. 16. Depending on the type of RFID reader (62 or 462), the POS 64 can detect the ID tag of each outgoing container either one at a time 460 or all at once 463. Optionally the POS can simply look up the UserID for the customer based on the reading of one container, and look up all of transactions carried out for that customer's containers 465. Depending on the jurisdiction, a government approved "Legal for Trade" scale 468 must be used to sell food by weight. In such a case, it may be economical to use a fewer number of scales at the POS rather than include one in each dispenser. In which case, the UI for each dispenser may indicate that the final price will be determined at POS, or simply indicate that if there is a discrepancy, the POS price will be charged. The POS check out station will then retrieve information on products contained in the outgoing container, said information stored responsive to said dispensing transaction by querying the transaction and product databases 470, and then calculate and display the price 473. The system can additionally retrieve discount information associated with the customer and/or product and automatically applying any user based discounts in calculating the price. Optionally, depending on market research, the savings (economy) obtained by buying the product in bulk (as compared to a conventional store) may be displayed to encourage the customer to continue purchasing products in bulk at the retail establishment. The customer than pays 475, which can be automated if the customer has provided automatic payment authorization.

In order to protect against theft or inadvertent non-payment, the store may optionally be equipped with a long range RFID reader 69 at exit. It would detect all container IDs 478 of containers at the exit, and confirm payment has been made 480. If a container has not been paid for, the system would prompt the user to return to POS or sound an alarm 484, if a container has not been paid for. Optionally, the system can automatically open exit door 482 if, and potentially only if, payment for all containers has been made.

Embodiments attempt to manage users within the store to optimize each user time and movement within the store, via greeting station 35. For example, when entering the store, the client could be asked if it wants to refill its containers with the same products as the previous time. In this case, the store includes visual indications showing the client where to refill its containers. For example, each station will have signs (not shown) indicating the type, and possibly brands, of products it dispenses, and also may have an indicator light (not shown), which may be able to illuminate different colors, or flash on and off, etc. This would help the client save time in locating the needed filling stations. An exemplary process executed by the greeting station is illustrated in FIGS. 17A and 17B.

Figure 17A:
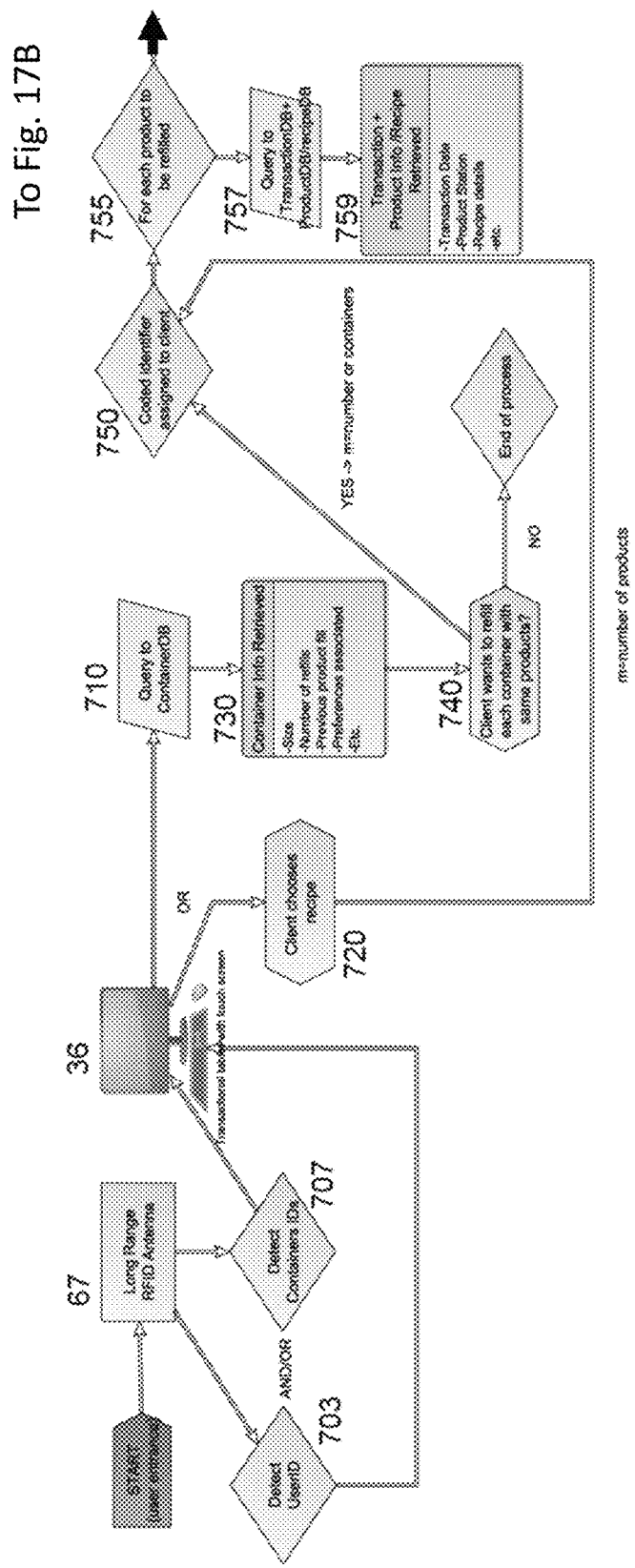
FIGS. 17A and 17B are, respectively, parts 1 and 2 of a flow chart illustrating a store management process according to an exemplary embodiment.
Figure 17B:
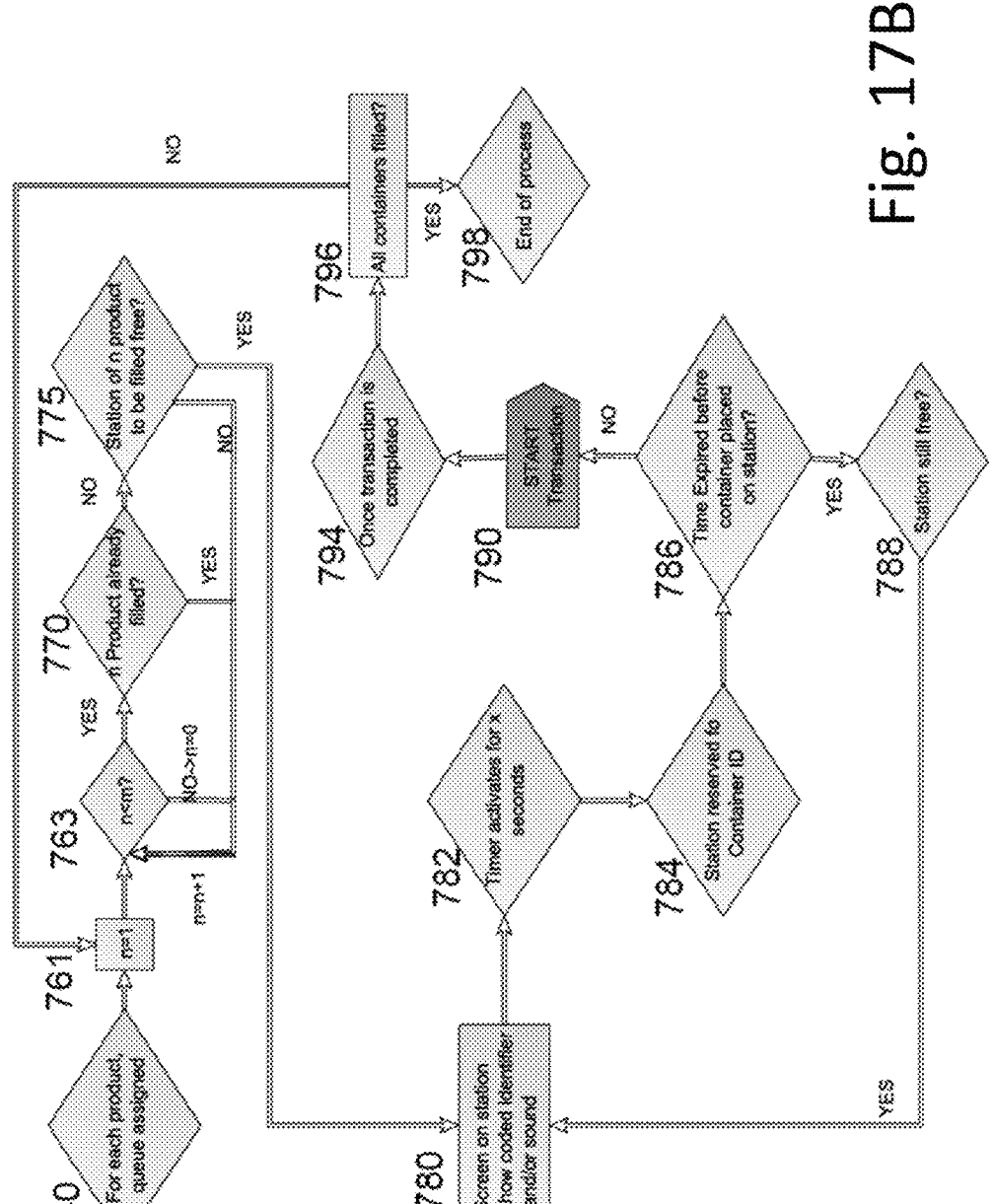

FIGS. 17A and 17B show parts 1 and 2 of a flowchart for store management, illustrating steps executed by a controller of the greeting station 35 or alternatively, via a central controller (not shown), according to an exemplary embodiment which helps manage flow of customers who want to refill containers with the same products 740 or want to fill a container with recipe ingredients 720. In such situations, the controller can determine where the customer will need to go, and can help speed the customer through those destinations. To do so, the user ID is detected at long range RFID antenna 67. This antenna can detect the UserID directly, for example via smart phone or via detecting container IDs 707 and then looking up user ID associated with the containers. The user can also enter a user ID at station 36 directly, for example, if they are a new customer or need to purchase new containers for a recipe. In the case of refilling containers, the system will query the Container Database 710 for information associated with each container. Information retrieved 730 includes the size/type of container, the number of refills, the product previously filled in the container, customer preferences, etc.

Note that, a customer need not check in with the greeting station if they want to browse and do not have a set recipe or set of containers to refill. Assuming a customer either wants to refill a set of containers with the same products 740 or chooses a recipe or other user selected mix of items, then the system enters them into a queue management routine to try and direct them through the store in an optimal manner. The advantage of such a system is to avoid having clients line up at dispensing stations when there are free stations for products the system knows the clients wants to use. Of course the customer can identify everything they want through the touch screen of the greeting station if they want to be efficiently directed through the store.

In any event, the system knows from above a number of products m a customer wants. This number is equal to the number of containers unless they are mixing multiple products into a container. A coded identifier is assigned to the client 750. The process then has 4 main stages. There is a database lookup to determine which products need to be dispensed, and where they are located. Then there is a routine for determining which (unused) station to send the customer. Then there is a station reservation routine for reserving the station for the customer for a defined period of time (so that another customer does not start using it while a customer is walking towards it). Finally the customer fills a container at a station, and then the process repeats (to determine next station which is free for the customer to use) until the customer is finished filling dispensing the m products.

Looking at these stages in more detail according to the exemplary example illustrated, for each product to be refilled (or filled, for example in the case of a recipe) 755, a database query is executed 757. This determines 759 the transaction date, identifies the product station, determines what is needed for a recipe, etc. Each product is then assigned a queue 760. A loop is then established through steps 761, 763, 770 and 775, along with 796 to determine the next free station for the customer to use, until each product has been dispensed. Once the next free station to be used has been identified, an indication 780 is presented to the customer. A timer is then activated 782 to allow the customer to walk to the assigned station, and that station is reserved for that customer 784. Presumably the customer will place the container to be filled in the dispensing station and start the dispensing transaction 790 before the timer expires. So, for example, if the customer starts talking to someone, the station is freed up for another user. If the timer expires, and no other user is waiting for the station 788 then the station can be reserved for another period of time. Otherwise, the customer will may need to return to the greeting station, or simply fill their containers at stations which are free (neither being used, nor reserved for other clients). Once the transaction is completed, 794, the system will determine if another station needs to be allocated 796 or the process ends.

When filling the container, and/or at the POS, an embodiment displays information (e.g., number of refills, money saved over time, environmental impact, etc.) on the filling station screen to provide feedback to the user as to the benefits (both to themselves and the environment) to encourage continued use of the system. Alternatively, or in addition, such information can be sent to the user by other means, such as email or through an application program residing on a user device, such as a smartphone. Indeed, while it is expected that most dispensing systems would provide a user interface for interacting with the customer, it is possible that such an interface could be implemented on such a user device. Smartphones could also be used to provide the system with the userID using embedded NFC chips at the dispensing, greeting and POS stations.

Advantages of the methods and systems discussed herein include lower costs for suppliers (who can reduce their packaging, inventory and shipping costs by distributing and selling their products in bulk), lower costs for retailers (who can obtain product at lower price, using less retail space, fewer/no employees on the retail floor, better inventory management, more opening hours (possibility to operate 24/7) and less handling costs) and consumers (who can obtain the same product for a lower cost due to savings being passed down from the suppliers and retailers), while having a positive impact on the environment and offer a better buying experience to consumers.

Computerization of all filling operations will also allow tracking of client interest for particular products. For example, it may be discovered that clients from a small rural town tend to buy olive oil at the best price possible, whereas clients in trendy urban locations tend to opt for a pricier organic olive oil. By noting this fact, it would be possible to adjust the tank sizes in both stores accordingly and favorably impact the supply chain. Further, it would help determine what products to offer in particular locations as well as the size of bulk bins.

Furthermore, this solution allows the manufacturer to reduce its costs by filling bulk containers instead of single-use packaging. Finally, the client is involved in the process by participating to the filling operation, reducing the number of employees on the floor and the operating costs. Further, by limiting losses and reducing theft, store margins will be significantly higher than the competition.

Herein, the term user preferences includes allergy information, as a user who is allergic to an item will have a preference associated with it, e.g. either not to allow it, or in the case of mild allergy in multi-person household, the user may simply want the item or allergen clearly identified, and to ensure it is not placed in allergen free containers, or conversely, not allow an item to be placed in a container which has previously been filled with an allergen.

While exemplary embodiments have been described in detail, it will be appreciated that variations and modifications may be made to these embodiments.

For example, in the exemplary embodiments described above, moveable assemblies or robotic assemblies are used at the dispensing stations for positioning and alignment of containers to receive liquid products or solid product. The user may be provided with visual indicators or co-ordinates of the dispensing station, to assist in guiding the user to the appropriate dispensing station. In alternative embodiments, instead of a moveable assemblies or a robotic assembly at a dispensing station or substation for positioning of the container to receive product, the system may provide another form of placement and alignment means. For example, a visual indicator, e.g. indicator lights and markings and/or an audible indicator and other forms of sensors, may be provided to guide a user in placement and alignment of a container at the appropriate position at a product dispensing station, for receiving a selected product. By way of example, the platform for placement of a container may have visual markers or indicators for each of a plurality of product dispensing positions for respective different products. Then, on selection of a product by the user, the appropriate dispensing position for placement of the container is indicated to the user by illumination or by a flashing light. If required, sensors at the dispensing location will confirm correct positioning and alignment of the container for receiving product, or e.g. the systems will direct the user to re-position the container.

As another example, while preferred embodiments have been described with reference to RFID tags, antennas and readers, the system is not limited to RFID. Other short range and/or long range ID tags and ID readers could be utilized, e.g. Surface Acoustic Wave (SAW) sensors/tags, other near-field communications devices and sensors, and barcode tags/scanners.

Although embodiments of the invention have been described and illustrated in detail, it is to be clearly understood that the same is by way of illustration and example only and not to be taken by way of limitation, the scope of the present invention being limited only by the appended claims.

The invention claimed is:

1. A bulk product dispensing system for dispensing and sale of bulk product to consumers at a vending location, comprising:
   a dispensing station comprising an ID tag reader and a
      bulk product dispenser for dispensing bulk product into a re-usable container which includes an ID tag providing a container ID uniquely identifying said container;
a database server comprising:
a) a container database storing for each of a plurality of containers, the container ID and associated container information comprising: container characteristics, comprising a container type and at least one of a container size and weight; and container fill history;
b) a user information database storing for each of a plurality of users, a user ID uniquely identifying the user and associated user information comprising user preferences; and
c) wherein each user ID is linked to the container ID for each of one or more containers registered to the user ID and the container ID for each of said one or more containers is linked with user preferences selected for the container ID;
a dispenser controller comprising a processor, a machine readable medium storing instructions and a communication interface configured for communication with the ID tag reader and with the database server, the dispenser controller being configured to communicate with the ID tag reader to obtain the container ID of a container placed at the dispensing station and to communicate with the database server using said container ID to perform a lookup of the user ID, associated user information, associated container information, and user preferences selected for said container ID;
a user interface for communication with a user;
said dispenser controller in communication with the user interface, the user interface configured for receiving from a user a product fill request for at least one product selected from a plurality of bulk products available to be dispensed by said dispenser, said product fill request comprising a user selected amount of each of said at least one product;
said dispenser controller configured to verify compatibility of said product fill request with said container by verifying the product requested satisfies restrictions based on said associated container information and user preferences selected for the container ID and responsive to said verifying, either controlling said dispenser to fill said container with the user selected amount of the at least one product, or displaying a warning to the user if the product fill request is not compatible.

2. The bulk product dispensing system as claimed in claim 1, wherein said dispenser controller displays a warning to the user of a detected incompatibility of said product fill request with said container, and presents at least one of: a suggestion to use a different container, an option to change the product fill request and an option to confirm the product fill request.

3. The bulk product dispensing system as claimed in claim 1, further comprising an alignment controller for aligning the opening of said container to a dispensing mechanism of a selected product.

4. The bulk product dispensing system as claimed in claim 3, wherein the dispensing mechanism for each product comprises a flexible channel, each flexible channel having a first opening connected to a bulk reservoir of a particular bulk product to be dispensed and a second opening, said second opening movable within said dispenser, and upon receiving a request for dispensing a said particular bulk product, said alignment controller moves said second opening to a dispensing location aligned with the opening of said container.

5. The bulk product dispensing system as claimed in claim 3, further comprising: a robotic assembly for moving said container to a position associated with the selected product for receiving said product.

6. The bulk product dispensing system as claimed in claim 3, further comprising placement means for positioning a plurality of types of containers such that the opening of each can be properly aligned with said dispensing mechanism, wherein the placement means comprises any one of: placement guides, placement grooves, a moveable assembly, a robotic assembly, a visual marker, a visual indicator, an audible indicator, a proximity sensor, a location sensor, and a combination thereof.

7. The bulk product dispensing system as claimed in claim 1, wherein said database server further comprises a product database storing product information, and said controller is configured to query the product database for stored product information comprising product characteristics of products available to be dispensed, compare those characteristics to user preferences, and highlight compatible products to the user through said user interface.

8. The system as claimed in claim 1, further comprising:
at an entrance to the vending location:
a first long range ID reader having a communications interface to the dispenser controller for reading ID tags for incoming containers, and transmitting the container ID to the dispenser controller for retrieval of user information and container information associated with the container ID;
a user interface at a reception station for receiving from a user a request for filling a container with a product selected from a group of products and directing a user to a dispensing station for the selected product.

9. The bulk product dispensing system as claimed in claim 1, wherein the dispensing station is one of a plurality of dispensing stations at the vending location for dispensing a plurality of bulk products, wherein said dispenser controller is configured to receive an indication from the user that they intend to fill a container with multiple items according to a user selected mix, and the dispenser controller will store information as to which items and amounts are to be filled in said container and control one or more of said dispensing stations to fill the container with said amounts of said multiple items.

10. The bulk product dispensing system as claimed in claim 1, wherein the user interface for communication with the user comprises one of: a user interface device at the dispensing station; a user interface device at a greeting station or other station at the vending location; a user interface configured for network communication with a user device for receiving user input and providing output to the user; and a combination thereof.

11. The bulk product dispensing system as claimed in claim 1, wherein said dispenser is one of a plurality of dispensers at the vending location configured for dispensing a plurality of dry goods and liquid products into a plurality of container types,
a first subset of container types being compatible with dispensers configured for dispensing dry goods and a second subset of container types being compatible with dispensers configured for dispensing liquid products, and wherein after obtaining the container ID of a container placed at said dispenser, the dispenser controller confirms compatibility of the container type with said dispenser.

12. The bulk product dispensing system as claimed in claim 1, wherein said database server further comprises a product database storing real-time product information and said dispenser controller is configured to query the product database for product availability and display a list of products available at the dispensing station.

13. A method of managing dispensing and sale of bulk products to consumers at a vending location comprising a bulk product dispensing system as defined in claim 1, comprising a plurality of dispensing stations for dispensing a plurality of bulk products, comprising:

in the database server of the dispenser control system:
for each of a plurality of reusable containers, each having an ID tag providing a container ID uniquely identifying the container, storing in the container database the container ID and associated container information, the associated container information comprising: container characteristics, comprising a container type and at least one of a container size and weight; and container fill history;
for each of a plurality of users, storing in the user information database a user ID uniquely identifying the user and associated user information comprising user preferences;
for each user, registering one or more containers to the user, comprising linking the user ID and container IDs for each of said one or more containers and linking each container ID to user preferences selected for the container ID;

at the dispensing station comprising the ID tag reader:
reading the ID tag of the container to be filled to obtain the container ID;

in the dispenser control system:
receiving said container ID from the ID tag reader;
querying the database server using the container ID to perform a lookup of the user ID, associated user information, associated container information, and user preferences selected for said container ID;
receiving from a user interface in communication with the control system a product fill request for filling a container with at least one selected product selected from a plurality of bulk products available at said dispensing station, said product fill request comprising a user selected amount of said at least one selected product;
confirming compatibility of said product fill request and the container by verifying the product fill request satisfies restrictions based on said associated container information and user preferences selected for the container ID, and
responsive to said verifying:
if the product fill request is compatible, dispensing the user selected amount of the at least one product into the container, and storing transaction information comprising what was dispensed into the container; or
if the product fill request is not compatible, displaying a warning to the user.

14. The method as claimed in claim 13, further comprising, at a point of sale:
reading the ID tag of each outgoing container;
retrieving information on products contained in each outgoing container, said information stored responsive to said dispensing;
determining price to be charged for product contained in each outgoing container of the user.

15. The method as claimed in claim 14, further comprising, at said point of sale: retrieving discount information associated with the information and automatically applying any user based discounts.

16. The method as claimed in claim 13, wherein said confirming compatibility step comprises confirming said product fill request is consistent with user preferences comprising allergy information.

17. The method as claimed in claim 13, wherein if the product fill request is not compatible, further comprising determining said user possesses a plurality of containers, retrieving prior fill history of said containers, and displaying a suggestion to said user to select another of said containers for the requested product.

18. The method as claimed in claim 13, further comprising:
in said control system,
maintaining a real-time inventory database for all products by adjusting said inventory database each time a product is dispensed, and for each product, ordering additional inventory when the amount of product reaches a threshold.

19. The method as claimed in claim 18, further comprising:
in said control system, storing information regarding product selection on a per-product and per-user basis and providing suppliers with feedback as to related purchases.

20. The method as claimed in claim 13, wherein:
each dispensing station comprises a media content controller for displaying media content to the user, and further comprising displaying media content selected based on said information.

21. The method as claimed in claim 13, further comprising:
at a greeting station in the vending location:
reading the ID of each incoming container;
retrieving fill history comprising what was previously dispensed into each container;
asking if the user intends to refill any of the containers with the same product, and if so:
assigning the user to a queue for each station needed to refill a product,
determining queue waits for dispensers needed for product refills, and
directing the user to the next available station, and having said next available station direct the user to a subsequent station repeatedly until all containers are refilled.

* * * * *